United States Patent
Hao et al.

(10) Patent No.: US 11,552,926 B2
(45) Date of Patent: Jan. 10, 2023

(54) METHOD RELATED TO SENDING MANAGEMENT IP ADDRESS AND SYSTEM

(71) Applicant: Huawei Technologies Co., Ltd., Shenzhen (CN)

(72) Inventors: Jianwu Hao, Beijing (CN); Yawei Zhang, Beijing (CN); Songyan Chen, Beijing (CN); Zhiyong Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/535,221

(22) Filed: Nov. 24, 2021

(65) Prior Publication Data
US 2022/0166745 A1    May 26, 2022

(30) Foreign Application Priority Data
Nov. 25, 2020   (CN) .......................... 202011338677.8

(51) Int. Cl.
G06F 15/16      (2006.01)
H04L 61/5007    (2022.01)
H04L 41/12      (2022.01)

(52) U.S. Cl.
CPC .......... H04L 61/5007 (2022.05); H04L 41/12 (2013.01)

(58) Field of Classification Search
CPC .......................... H04L 61/5007; H04L 41/12
USPC ........................................................ 709/245
See application file for complete search history.

(56) References Cited

U.S. PATENT DOCUMENTS

| | | |
|---|---|---|
| 2005/0078824 A1 | 4/2005 | Malinen et al. |
| 2010/0067509 A1 | 3/2010 | Lambert |
| 2014/0237128 A1 | 8/2014 | Yue |
| 2020/0404499 A1 | 12/2020 | Zhu et al. |
| 2022/0166745 A1* | 5/2022 | Hao ..................... H04L 61/5007 |

FOREIGN PATENT DOCUMENTS

| | | | | |
|---|---|---|---|---|
| CA | 2736956 A1 * | 6/2012 | | |
| CN | 1875598 A | 12/2006 | | |
| CN | 101841790 A | 9/2010 | | |
| CN | 102196051 A | 9/2011 | | |
| CN | 102421201 A | 4/2012 | | |
| CN | 103327482 A | 9/2013 | | |
| CN | 105591798 A * | 5/2016 | ......... | H04L 41/0809 |
| CN | 106936718 A * | 7/2017 | ......... | H04L 12/2859 |
| CN | 107733727 A * | 2/2018 | ......... | H04L 41/0893 |
| CN | 108541031 A | 9/2018 | | |
| CN | 110012458 A | 7/2019 | | |

(Continued)

*Primary Examiner* — Hee Soo Kim
(74) *Attorney, Agent, or Firm* — Conley Rose, P.C.

(57) ABSTRACT

A method includes a second system that determines a type of a first management Internet Protocol (IP) address, and sends, to a first system, first information used to indicate the type of the first management IP address; the first system determines the first management IP address based on the type of the first management IP address indicated by the first information, and releases a first correspondence between system identification information and the first management IP address to an advertisement system; the advertisement system sends the first correspondence to a network management system; and the network management system manages the first system based on the first correspondence.

20 Claims, 19 Drawing Sheets

(56) References Cited

FOREIGN PATENT DOCUMENTS

| | | | |
|---|---|---|---|
| CN | 110061888 | A | 7/2019 |
| CN | 110366011 | A | 10/2019 |
| CN | 111511041 | A | 8/2020 |
| JP | 2003304246 | A | 10/2003 |
| JP | 2016063458 | A | 4/2016 |

* cited by examiner

```
 0 1 2 3 4 5 6 7 8 9 0 1 2 3 4 5 6 7 8 9 0 1 2 3 4 5 6 7 8 9 0 1
```

| LS age | | Options | 10 |
|---|---|---|---|
| Opaque type | | Opaque ID | |
| Advertising router ID ||||
| LS sequence number ||||
| LS checksum || Length of opaque information ||
| TLV type || TLV length ||
| System identification information || Mask bits ||
| IPv4 management IP address ||||

| LS age | 1 | S12 | Function code |
|---|---|---|---|
| Link state ID ||||
| Advertising router ID ||||
| LS sequence number ||||
| LS checksum ||| Length of opaque information |
| TLV type ||| TLV length |
| TLV value ||||
| TLV ... ||||

FIG. 7

| 0 1 2 3 4 5 6 7 8 9 | 0 1 2 3 4 5 | 6 7 8 9 | 0 1 2 3 4 5 6 7 8 9 0 1 |
|---|---|---|---|
| LS age | 1 | S12 | 12 |
| 0 ||||
| Advertising router ID ||||
| LS sequence number ||||
| LS checksum || Length of opaque information ||
| TLV type || TLV length ||
| System identification information ||| Prefix length |
| IPv6 management IP address ||||
| IPv6 management IP address ||||
| IPv6 management IP address ||||
| IPv6 management IP address ||||

FIG. 8

METHOD RELATED TO SENDING MANAGEMENT IP ADDRESS AND SYSTEM

CROSS-REFERENCE TO RELATED APPLICATION

This application claims priority to Chinese Patent Application No. 202011338677.8 filed on Nov. 25, 2020, which is hereby incorporated by reference in its entirety.

TECHNICAL FIELD

This application relates to the field of communications technologies, and in particular, to a method related to sending a management Internet Protocol (IP) address and a system.

BACKGROUND

With the development of communications technologies, more systems such as network element devices and servers are deployed in a communications network. A network management system operates, administrates, and maintains a large quantity of network element devices and servers based on management IP addresses, including operating, administrating, and maintaining deployment, access and online procedures, and configuration and management of these systems. With the wide use of IP version 6 (IPv6), the IPv6 technology is also used by a management communications network of the systems. With the development of the Internet of Things and wireless enterprise service terminals, there are more systems in enterprise intranets and various types of IP addresses. However, configuration of management IP addresses of the systems increases network operation and maintenance costs.

SUMMARY

Embodiments of this application provide a method related to sending a management IP address and a system, to resolve a problem in a related technology by using the method and the system.

According to a first aspect, an embodiment of this application provides a method related to sending a management IP address. A first system receives, from a second system, first information used to indicate a type of a first management IP address of the first system. The first system determines the first management IP address for the first system based on the first information. The first system sends a first correspondence between identification information of the first system and the first management IP address to an advertisement system. The first system may be a system to be managed by a network management system, and the second system is a system that can be already managed by the network management system. The advertisement system is a system that has already been managed by the network management system and supports to notify management information of the first system to the network management system. The management information is information that needs to be used when the network management system manages the first system or the second system. For example, the management information is the first management IP address. The first management IP address is used for communication between the first system and the network management system, and is also used for data communication between the first system and one or more second systems in a network. The first system receives the first information from the second system, and the first system may determine the first management IP address of the first system based on the type of the first management IP address indicated by the first information. According to this method, the first system can automatically select a type of a management IP address, so that a network administrator does not need to manually log in to the first system to configure management IP addresses and types of the management IP addresses. This improves efficiency of configuring the management IP addresses.

In a possible implementation, the first system receives second information from the second system, where the second information is used to indicate a type of a second management IP address of the first system. The first system determines the second management IP address for the first system based on the second information. The first system sends a second correspondence between the identification information of the first system and the second management IP address to the advertisement system. The second management IP address is an alternative switching address of the first management IP address. The alternative switching address is a management IP address used when a management IP address of the network needs to be switched. A management IP address needs to be switched in the following scenarios. The network management system needs to switch a type of a management IP address in a live network. For example, if the network management system uses an IP version 4 (IPv4) management IP address in the live network but the network management system needs to use an IPv6 management IP address subsequently, the network management system needs to switch a type of a management IP address. When a management IP address in the live network that was available cannot be used, the network management system tries to switch to an alternative switching address to continue to manage the system. When a management IP address that is being used by the first system or the second system cannot be normally used, or when the network management system needs to switch a type of a management IP address of the entire network or a part of the network, the network management system needs to use an alternative switching address of the system to continue to perform operation, administration and maintenance (OAM) on the system in the network. According to this method, the network management system may obtain the second management IP address of the system when the system is being online or after the system is online, and is configured to switch and back up a management IP address. This method improves efficiency of switching the management IP address by the network management system, and improves reliability of the network management system.

In a possible implementation, the second system and the advertisement system are a same system or different systems. This method reduces a probability that a single point of failure occurs because one system is deployed in a network, and further reduces a processing performance requirement of the system.

In a possible implementation, before the first system receives, from the second system, the first information used to indicate the type of the first management IP address of the first system, the first system sends a request packet for the type of the first management IP address to the second system. Because the request packet for the type of the first management IP address sent by the first system triggers a request procedure for the type of first management IP address, the second system needs to send a response packet after receiving the request packet for the type of the first management IP address. The response packet includes the first information.

In a possible implementation, the first system receives a Point-to-Point Protocol over Ethernet (PPPoE) packet from the second system, where the PPPoE packet received by the first system includes the first information. The first system initiates a PPPoE negotiation procedure with the second system to trigger the request procedure for the type of the first management IP address. The second system may send the first information by using a PPPoE negotiation packet including the first information. The first information is in an extension field of a request packet in a PPPoE discovery phase, or the first information is in an extension field of a Network Control Protocol (NCP) request packet in a PPPoE session phase.

In a possible implementation, before the first system receives, from the second system, the second information used to indicate the type of the second management IP address of the first system, the first system sends a request packet for the type of the second management IP address to the second system. Because the request packet for the type of the second management IP address sent by the first system triggers a request procedure for the type of the second management IP address, after receiving the request packet for the type of the second management IP address, the second system needs to send a response packet. The response packet includes the second information.

In a possible implementation, the first system receives a PPPoE packet from the second system, where the PPPoE packet received by the first system includes the second information. The first system initiates a PPPoE negotiation procedure with the second system to trigger the request procedure for the type of the second management IP address. The second system may send the second information included in a PPPoE negotiation packet. The second information is in an extension field of a request packet in a PPPoE discovery phase, or the second information is in an extension field of a NCP request packet in a PPPoE session phase.

In a possible implementation, before the first system receives, from the second system, the first information used to indicate the type of the first management IP address of the first system and the second information used to indicate the type of the second management IP address of the first system, the first system sends a request packet for the type of the management IP address to the second system, and the second system needs to send a response packet after receiving the request packet for the type of the management IP address. The request packet for the type of the management IP address includes a request for the type of the first management IP address and a request for the type of the second management IP address. The response packet includes the first information and the second information.

In a possible implementation, the first system receives a PPPoE packet from the second system, where the PPPoE packet received by the first system includes the first information and the second information. The first system initiates a PPPoE negotiation procedure with the second system to trigger a request procedure for the type of the first management IP address and a request procedure for the type of the second management IP address. The second system may send the first information and the second information that are included in a PPPoE negotiation packet. The first information and the second information are in an extension field of a request packet in a PPPoE discovery phase, or the first information and the second information are in an extension field of a NCP request packet in a PPPoE session phase.

In a possible implementation, the first system determines the first management IP address for the first system based on the type of the first management IP address indicated by the first information. If the first system has generated one or more management IP addresses, the first system determines the first management IP address based on the first information from the one or more generated management IP addresses. If the first system has not generated management IP addresses, the first system generates the first management IP address based on the first information.

In a possible implementation, the first system determines the second management IP address for the first system based on the type of the second management IP address indicated by the second information. If the first system has generated one or more management IP addresses, the first system determines the second management IP address based on the second information from the one or more generated management IP addresses. If the first system has not generated management IP addresses, the first system generates the second management IP address based on the second information.

In a possible implementation, the first system sends the first correspondence to the advertisement system based on a flood packet. The first correspondence is a correspondence between the identification information of the first system and the first management IP address of the first system. The advertisement system may establish a routing relationship between the advertisement system and the first system based on the first correspondence. The network management system may manage the system based on the first correspondence. The first system sends the first correspondence to the advertisement system based on opaque link-state advertisement (LSA) information of an Open Shortest Path First (OSPF) routing protocol, or the first system sends the first correspondence to the advertisement system based on an extension field of an Intermediate System to Intermediate System (IS-IS) routing protocol.

In a possible implementation, the first system sends the second correspondence to the advertisement system based on a flood packet. The second correspondence is a correspondence between the identification information of the first system and the second management IP address of the first system. The network management system may switch a management IP address of the system based on the second correspondence. The first system sends the second correspondence to the advertisement system based on opaque LSA information of an OSPF routing protocol, or the first system sends the second correspondence to the advertisement system based on an extension field of an IS-IS routing protocol.

In a possible implementation, when the second system and the advertisement system are different systems, the first system sends the first correspondence to the second system. The first system sends the first correspondence to the second system, and the second system receives and records the first correspondence. The second system may back up information about the first correspondence. When the advertisement system malfunctions and cannot send the first correspondence, the second system provides the backup information. In addition, the second system may check, based on the first correspondence, a type of a first management IP address generated by the first system. This method can improve reliability of advertising management IP addresses.

In a possible implementation, when the second system and the advertisement system are different systems, the first system sends the second correspondence to the second system. The first system sends the second correspondence to the second system, and the second system receives and records the second correspondence. The second system may back up information about the second correspondence. When the advertisement system malfunctions and cannot send the second correspondence, the second system provides the backup information. In addition, the second system may check, based on the second correspondence, a type of a second management IP address generated by the first system. This method can improve reliability of advertising management IP addresses.

In a possible implementation, when the second system and the advertisement system are different systems, the first system sends the first correspondence and the second correspondence to the second system. The first system sends the first correspondence and the second correspondence to the second system, where the second system receives and records the first correspondence and the second correspondence. The second system may back up information about the correspondences. When the advertisement system malfunctions and cannot send the correspondences, the second system provides the backup information. In addition, the second system may check, based on the correspondences, a type of a second management IP address and a type of a first management IP address that are generated by the first system. This method can improve reliability of advertising management IP addresses.

According to a second aspect, an embodiment of this application provides a method related to sending a management IP address. A second system determines a type of a first management IP address of a first system, and the second system sends, to the first system, first information used to indicate the type of the first management IP address of the first system.

In a possible implementation, the second system determines the type of the first management IP address of the first system based on a type of a management IP address of the second system. The second system can be already managed by a network management system. In this case, the type of the management IP address of the second system is a network management IP address of a network in which the second system is located. Therefore, the second system can determine the type of the first management IP address of the first system based on the type of the management IP address of the second system. The second system needs to send information about the determined type of the first management IP address of the first system to the first system. The first system may determine the first management IP address of the first system based on the type. According to this method, the first system may determine a type of a management IP address based on a type of a network management IP address, so that a network administrator does not need to manually log in to the first system to configure management IP addresses and types of the management IP addresses. This improves efficiency of configuring the management IP addresses.

In a possible implementation, the second system sends, to the first system, the first information used to indicate the type of the first management IP address of the first system. After the second system receives a request packet for the type of the first management IP address, the second system sends a response packet. The response packet includes the first information.

In a possible implementation, the second system sends, to the first system, the first information used to indicate the type of the first management IP address of the first system. The second system performs PPPoE packet negotiation with the first system. The second system may send the first information by using a PPPoE negotiation packet. The first information is in an extension field of a request packet in a PPPoE discovery phase, or the first information is in an extension field of an NCP request packet in a PPPoE session phase.

In a possible implementation, the second system sends, to the first system, second information used to indicate a type of a second management IP address of the first system. After the second system receives a request packet for the type of the second management IP address, the second system sends a response packet. The response packet includes the second information.

In a possible implementation, the second system sends, to the first system, second information used to indicate a type of a second management IP address of the first system. The second system performs PPPoE packet negotiation with the first system. The second system may send the second information by using a PPPoE negotiation packet. The first information is in an extension field of a request packet in a PPPoE discovery phase, or the second information is in an extension field of an NCP request packet in a PPPoE session phase.

In a possible implementation, the second system sends, to the first system, the first information used to indicate the type of the first management IP address of the first system and second information used to indicate a type of a second management IP address of the first system. After the second system receives a request packet for the type of the management IP address, the second system sends a response packet. The request packet for the type of the management IP address includes a request for the type of the first management IP address and a request for the type of the second management IP address. The response packet includes the second information.

In a possible implementation, the second system sends, to the first system, the first information used to indicate the type of the first management IP address of the first system and the second information used to indicate the type of the second management IP address of the first system. The second system performs PPPoE packet negotiation with the first system. The second system may send the first information and the second information by using a PPPoE negotiation packet. The first information and the second information are in an extension field of a request packet in a PPPoE discovery phase, or the first information and the second information are in an extension field of an NCP request packet in a PPPoE session phase.

In a possible implementation, the second system receives, from the first system, a first correspondence between identification information of the first system and the first management IP address of the first system. The second system receives and records the first correspondence. The second system sends the first correspondence to a network management system. When an advertisement system malfunctions, the second system sends the first correspondence to the network management system. This method improves reliability of the network management system.

In a possible implementation, the second system may further check whether a type of a first management IP address received from the first system complies with the type of the first management IP address of the first system indicated by the first information. For example, the second system compares the type of the first management IP address in the first correspondence with the type of the first management IP address determined by the second system. If the type of the first management IP address in the first correspondence is the same as the type of the first management IP address determined by the second system, it indicates that the first system determines the first management IP address based on the type of the first management IP address indicated by the first information that is sent by the second system. If the type of the first management IP address in the first correspondence is different from the type of the first management IP address determined by the second system, it indicates that the first system determines the first management IP address not based on the type of the first management IP address indicated by the first information that is sent by the second system, and the first system needs to re-determine a first management IP address. Checking the first management IP address in the first correspondence can improve reliability and availability of the network management system.

In a possible implementation, the second system receives, from the network management system, information used to indicate a type of a second management IP address of the first system. The second system determines the type of the second management IP address of the first system based on the information used to indicate the type of the second management IP address of the first system. The second system sends, to the first system, second information used to indicate the type of the second management IP address of the first system. The second management IP address is an alternative switching address of the first management IP address. A management IP address needs to be switched in the following scenarios. The network management system needs to switch a type of a management IP address in a live network. For example, if the network management system uses an IPv4 management IP address in the live network but the network management system needs to use an IPv6 management IP address subsequently, the network management system needs to switch a type of a management IP address. When a management IP address in the live network that was available cannot be used, the network management system tries to switch to an alternative switching address to continue to manage the system. When a management IP address that is being used by the first system or the second system cannot be normally used, or when the network management system needs to switch a type of a management IP address of the entire network or a part of the network, the network management system needs to use an alternative switching address of the system to continue to perform OAM on the systems in the network. According to this method, the network management system may obtain the second management IP address of the system when the system is being online or after the system is online, and is configured to switch and back up a management IP address. This method improves efficiency of switching the management IP address by the network management system, and improves reliability of the network management system. The network management system provides a function of configuring a type of an alternative switching address. After the network administrator configures the alternative switching address, the network management system sends, to the second system, the information used to indicate the type of the second management IP address of the first system. The second system receives the information, and determines the type of the second management IP address of the first system based on the type of the second management IP address indicated by the information. The second system sends, to the first system, second information used to indicate the type of the second management IP address of the first system. In this case, the second system receives, from the first system, a second correspondence between identification information of the first system and the second management IP address of the first system. The second system sends the second correspondence to the network management system.

In a possible implementation, the second system may further check whether a type of the second management IP address received from the first system complies with the type of the second management IP address of the first system indicated by the second information. For example, the second system compares the type of the second management IP address in the second correspondence with the type of the second management IP address determined by the second system. If the type of the second management IP address in the second correspondence is the same as the type of the second management IP address determined by the second system, it indicates that the first system determines the second management IP address based on the type of the second management IP address indicated by the second information that is sent by the second system. If the type of the second management IP address in the second correspondence is different from the type of the second management IP address determined by the second system, it indicates that the first system determines the second management IP address not based on the type of the second management IP address indicated by the second information that is sent by the second system, and the first system needs to re-determine the second management IP address. Checking the second management IP address in the second correspondence is checked can improve reliability and availability of the network management system.

In a possible implementation, the second system receives the first correspondence and the second correspondence from the first system. The second system sends the first correspondence and the second correspondence to the network management system.

In a possible implementation, the second system and the advertisement system are a same system or different systems. This method reduces a probability that a single point of failure occurs because one system is deployed in a network, and further reduces a processing performance requirement of the system.

In a possible implementation, the second system receives system role update information sent from the network management system, and updates a system role of the second system based on the system role update information. When the advertisement system malfunctions, the advertisement system cannot send information to the first system and/or the network management system, or cannot receive information from the first system and/or the network management system. In this case, the network management system malfunctions. The network management system sends the system role update information to the second system when the network management system detects that the advertisement system malfunctions, where the system role update information is used to indicate the second system to update the role to the second system and the advertisement system. After the second system receives the system role update information sent from the network management system, and updates the role to the second system and the advertisement system based on the system role update information, the second system may send, to the network management system, management information of the first system, for example, the first correspondence and/or the second correspondence. According to this method, the network management system can continue to operate properly, thereby improving network reliability.

According to a third aspect, an embodiment of this application provides a method related to sending a management IP address. A network management system sends, to a second system, information used to indicate a type of a second management IP address of a first system, where the second management IP address of the first system is an alternative switching address of the first system. The network management system receives a second correspondence between identification information of the first system and the second management IP address of the first system from the advertisement system. The second management IP address is an alternative switching address of a first management IP address. A management IP address needs to be switched in the following scenarios. The network management system needs to switch a type of a management IP address in a live network. For example, if the network management system uses an IPv4 management IP address in the live network but the network management system needs to use an IPv6 management IP address subsequently, the network management system needs to switch a type of a management IP address. When a management IP address in the live network that was available cannot be used, the network management system tries to switch to an alternative switching address to continue to manage the system. When a management IP address that is being used by the first system or the second system cannot be normally used, or when the network management system needs to switch a type of a management IP address of the entire network or a part of the network, the network management system needs to use an alternative switching address of the system to continue to perform OAM on the system in the network. According to this method, the network management system may obtain the second management IP address of the system when the system is being online or after the system is online, and is configured to switch and back up a management IP address. This method improves efficiency of switching the management IP address by the network management system, and improves reliability of the network management system. The network management system provides a function of configuring a type of an alternative switching address. After a network administrator configures the alternative switching address, the network management system sends, to the second system, the information used to indicate the type of the second management IP address of the first system. The first system determines the second management IP address and sends the second correspondence to the advertisement system. The network management system receives, from the advertisement system, the second correspondence between the identification information of the first system and the second management IP address of the first system.

In a possible implementation, the second system and the advertisement system are a same system or different systems. This method reduces a probability that a single point of failure occurs because one system is deployed in a network, and further reduces a processing performance requirement of the system.

In a possible implementation, when the network management system sends, to a second system, information used to indicate a type of a second management IP address of the first system, the network management system may send, to the second system according to a network management protocol and/or through an application programming interface (API) supported by the second system, the information used to indicate the type of the second management IP address of the first system.

In a possible implementation, the network management system receives the second correspondence according to a network management protocol and/or through an API supported by the network management system.

In a possible implementation, the network management system receives the first correspondence according to a network management protocol and/or through an API supported by the network management system.

In a possible implementation, the network management system receives the first correspondence and the second correspondence according to a network management protocol and/or through an API supported by the network management system.

In a possible implementation, the network management system receives a data packet including the second correspondence, and checks a system role of a sending system of the data packet. For example, a source media access control (MAC) address of the data packet is checked in the following manner. The source MAC address is compared with a MAC address that is of the advertisement system and that is set by the network management system, and if the source MAC address is the same as the MAC address of the advertisement system, the network management system receives the second correspondence, or if the source MAC address is different from the MAC address of the advertisement system, it indicates that the data packet is sent not by the advertisement system set by the network management system, and the data packet is discarded. Checking the source MAC address of the data packet can avoid the following case. The network management system receives a data packet that is sent by a system that is not the advertisement system or that is sent by a counterfeit advertisement system, and the network management system maintains a correspondence between incorrect system identification information and the second management IP address, causing a network management fault.

In a possible implementation, the network management system may further check whether a type of a received second management IP address complies with a type of a second management IP address configured by the network management system. For example, the network management system compares the type of the second management IP address in the second correspondence with the type of the second management IP address configured by the network management system. If the type of the second management IP address in the second correspondence is the same as the type of the second management IP address configured by the network management system, it indicates that the first system determines the second management IP address based on the type of the second management IP address indicated by the second information that is sent by the second system. If the type of the second management IP address in the second correspondence is different from the type of the second management IP address configured by the network management system, it indicates that the first system determines the second management IP address not based on the type of the second management IP address indicated by the second information that is sent by the second system, and the first system needs to re-determine the second management IP address. Checking the second management IP address in the second correspondence can improve reliability and availability of the network management system.

In a possible implementation, the network management system receives a data packet including the first correspondence, and checks a system role of a sending system of the data packet. For example, a source MAC address of the data packet is checked in the following manner. The source MAC address is compared with a MAC address that is of the advertisement system and that is set by the network management system, and if the source MAC address is the same as the MAC address of the advertisement system, the network management system receives the second correspondence, or if the source MAC address is different from the MAC address of the advertisement system, it indicates that the data packet is sent not by the advertisement system set by the network management system, and the data packet is discarded. Checking the source MAC address of the data packet can avoid the following case. The network management system receives a data packet that is sent by a system that is not the advertisement system or that is sent by a counterfeit advertisement system, and the network management system maintains a correspondence between incorrect system identification information and the first management IP address, causing a network management fault.

In a possible implementation, the network management system sends system role update information to the second system, where the system role update information is used to indicate the second system to update a system role. When the advertisement system malfunctions, the advertisement system cannot send information to the first system and/or the network management system, or cannot receive information from the first system and/or the network management system. In this case, the network management system malfunctions. The network management system sends the system role update information to the second system when the network management system detects that the advertisement system malfunctions, where the system role update information is used to indicate the second system to update the role to the second system and the advertisement system. After the second system updates the role of the second system to the second system and the advertisement system, the second system may send, to the network management system, management information of the first system, for example, the first correspondence and/or the second correspondence. In this way, the network management system can continue to operate properly, thereby improving network reliability.

According to a fourth aspect, an embodiment of this application provides a first system. The first system includes a first information receiving module configured to receive, from a second system, first information used to indicate a type of a first management IP address of the system, a first management IP address determining module configured to determine the first management IP address for the system based on the first information, and a first correspondence releasing module configured to send a first correspondence between identification information of the first system and the first management IP address to an advertisement system.

In a possible implementation, a second information receiving module is configured to receive, from the second system, second information used to indicate a type of a second management IP address of the first system, where the second management IP address is an alternative switching address of the first management IP address, a second management IP address determining module configured to determine the second management IP address for the first system based on the second information, and a second correspondence releasing module configured to send a second correspondence between the identification information of the first system and the second management IP address to the advertisement system.

In a possible implementation, the second system and the advertisement system are a same system or different systems. This method reduces a probability that a single point of failure occurs because one system is deployed in a network, and further reduces a processing performance requirement of the system.

In a possible implementation, a management IP address type request sending module is configured to send a request packet for a type of a management IP address of the first system. The first information receiving module is further configured to receive a response packet of the request packet for the type of the management IP address, where the response packet includes the first information.

In a possible implementation, the first information receiving module is configured to receive a PPPoE packet from the second system, to receive the first information used to indicate the type of the first management IP address of the system, where the PPPoE packet received by the first system includes the first information. The first information is in an extension field of a request packet in a PPPoE discovery phase, or the first information is in an extension field of an NCP request packet in a PPPoE session phase.

In a possible implementation, the first management IP address determining module is configured to determine the first management IP address from one or more generated management IP addresses based on the first information or generate the first management IP address based on the first information, for the system based on the type of the first management IP address indicated by the first information.

In a possible implementation, the first correspondence releasing module is configured to send the first correspondence between the identification information of the first system and the first management IP address to the advertisement system based on a flood packet. The first correspondence releasing module is configured to send the first correspondence between the identification information of the first system and the first management IP address to the advertisement system based on opaque LSA information of an OSPF routing protocol, or send the first correspondence to the advertisement system based on an extension field of an IS-IS routing protocol.

In a possible implementation, when the second system and the advertisement system are different systems, the first system sends the first correspondence to the second system. The first system sends the first correspondence to the second system, and the second system receives and records the first correspondence. The second system may back up information about the first correspondence. When the advertisement system malfunctions and cannot send the first correspondence, the second system provides the backup information. In addition, the second system may check, based on the first correspondence, a type of a first management IP address generated by the first system. This method can improve reliability of advertising management IP addresses.

In a possible implementation, when the second system and the advertisement system are different systems, the first system sends the second correspondence to the second system. The first system sends the second correspondence to the second system, and the second system receives and records the second correspondence. The second system may back up information about the second correspondence. When the advertisement system malfunctions and cannot send the second correspondence, the second system provides the backup information. In addition, the second system may check, based on the second correspondence, a type of a second management IP address generated by the first system. This method can improve reliability of advertising management IP addresses.

In a possible implementation, when the second system and the advertisement system are different systems, the first system sends the first correspondence and the second correspondence to the second system. The first system sends the first correspondence and the second correspondence to the second system, where the second system receives and records the first correspondence and the second correspondence. The second system may back up information about the correspondences. When the advertisement system malfunctions and cannot send the correspondences, the second system provides the backup information. In addition, the second system may check and the type of the first management IP address and the type of the second management IP address that are generated by the first system based on the correspondences. This method can improve reliability of advertising management IP addresses.

According to a fifth aspect, an embodiment of this application provides a second system. The second system includes a first management IP address type determining module configured to determine a type of a first management IP address of a first system, and a first information sending module configured to send, to the first system, first information used to indicate the type of the first management IP address.

In a possible implementation, the first management IP address type determining module is further configured to determine the type of the first management IP address of the first system based on a type of a management IP address of the second system.

In a possible implementation, the first correspondence receiving module is configured to receive, from the first system, a first correspondence between identification information of the first system and the first management IP address of the first system.

In a possible implementation, a first correspondence advertisement module is configured to send the first correspondence to a network management system.

In a possible implementation, a first management IP address checking module is configured to check whether a type of the first management IP address complies with the type of the first management IP address of the first system indicated by the first information.

In a possible implementation, a second management IP address type receiving module is configured to receive, from the network management system, information used to indicate a type of a second management IP address of the first system. A second management IP address type determining module is configured to determine the type of the second management IP address of the first system based on the information used to indicate the type of the second management IP address. A second information sending module is configured to send, to the first system, second information used to indicate the type of the second management IP address of the first system.

In a possible implementation, the second system sends, to the first system by using the first information sending module and the second information sending module, the first information used to indicate the type of the first management IP address and the second information used to indicate the type of the second management IP address of the first system.

In a possible implementation, a second correspondence receiving module is configured to receive, from the first system, a second correspondence between identification information of the first system and the second management IP address of the first system.

In a possible implementation, the second system receives the first correspondence and the second correspondence from the first system by using the first correspondence receiving module and the second correspondence receiving module.

In a possible implementation, a second correspondence advertisement module is configured to send the second correspondence to the network management system.

In a possible implementation, the second system sends the first correspondence and the second correspondence to the network management system by using the first correspondence advertisement module and the second correspondence advertisement module.

In a possible implementation, a second management IP address checking module is configured to check whether a type of the second management IP address received from the first system complies with the type of the second management IP address of the first system indicated by the second information. In a possible implementation, the second system and the advertisement system are a same system or different systems. This method reduces a probability that a single point of failure occurs because one system is deployed in a network, and further reduces a processing performance requirement of the system.

In a possible implementation, the second system further includes a system role update information processing module configured to receive system role update information from the network management system, and update a system role of the second system based on the system role update information.

According to a sixth aspect, an embodiment of this application provides a network management system. The network management system includes a second management IP address type sending module configured to send, to a second system, information used to indicate a type of a second management IP address of a first system, where the second management IP address is an alternative switching address of a first management IP address of the first system, and a second correspondence receiving module configured to receive, from an advertisement system, a second correspondence between identification information of the first system and the second management IP address of the system.

In a possible implementation, the second system and the advertisement system are a same system or different systems. This method reduces a probability that a single point of failure occurs because one system is deployed in a network, and further reduces a processing performance requirement of the system.

In a possible implementation, the second management IP address type sending module is configured to send, to the second system according to a network management protocol and/or through an API supported by the second system, the information used to indicate the type of the second management IP address of the first system.

In a possible implementation, the second correspondence receiving module is configured to receive, from the advertisement system, the second correspondence between the identification information of the first system and the second management IP address of the first system according to the network management protocol and/or through the API supported by the network management system.

In a possible implementation, by using the second correspondence receiving module, the network management system receives a data packet including the second correspondence, and checks a system role of a sending system of the data packet. For example, a source MAC address of the data packet is checked in the following manner. The source MAC address is compared with a MAC address that is of the advertisement system and that is set by the network management system, and if the source MAC address is the same as the MAC address of the advertisement system, the network management system receives the second correspondence, or if the source MAC address is different from the MAC address of the advertisement system, it indicates that the data packet is sent not by the advertisement system set by the network management system, and the data packet is discarded. Checking the source MAC address of the data packet can avoid the following case. The network management system receives a data packet that is sent by a system that is not the advertisement system or that is sent by a counterfeit advertisement system, and the network management system maintains a correspondence between incorrect system identification information and the second management IP address, causing a network management fault.

In a possible implementation, the network management system may further check, by using the second correspondence receiving module, whether the type of the second management IP address in the received second correspondence complies with a type of a second management IP address configured by the network management system. For example, the network management system compares the type of the second management IP address in the second correspondence with the type of the second management IP address configured by the network management system. If the type of the second management IP address in the second correspondence is the same as the type of the second management IP address configured by the network management system, it indicates that the first system determines the second management IP address based on the type of the second management IP address indicated by the second information that is sent by the second system. If the type of the second management IP address in the second correspondence is different from the type of the second management IP address configured by the network management system, it indicates that the first system determines the second management IP address not based on the type of the second management IP address indicated by the second information that is sent by the second system, and the first system needs to re-determine the second management IP address. Checking the second management IP address in the second correspondence can improve reliability and availability of the network management system.

In a possible implementation, the network management system receives, from the advertisement system by using the first correspondence receiving module, the first correspondence between the identification information of the first system and the first management IP address of the system.

In a possible implementation, the first correspondence receiving module is configured to receive, from the advertisement system, the first correspondence between the identification information of the first system and the first management IP address of the first system according to the network management protocol and/or through the API supported by the network management system.

In a possible implementation, by using the first correspondence receiving module, the network management system receives a data packet including the first correspondence, and checks a system role of a sending system of the data packet. For example, a source MAC address of the data packet is checked in the following manner. The source MAC address is compared with a MAC address that is of the advertisement system and that is set by the network management system, and if the source MAC address is the same as the MAC address of the advertisement system, the network management system receives the second correspondence, or if the source MAC address is different from the MAC address of the advertisement system, it indicates that the data packet is sent not by the advertisement system set by the network management system, and the data packet is discarded. Checking the source MAC address of the data packet can avoid the following case. The network management system receives a data packet that is sent by a system that is not the advertisement system or that is sent by a counterfeit advertisement system, and the network management system maintains a correspondence between incorrect system identification information and the first management IP address, causing a network management fault.

In a possible implementation, the network management system receives the first correspondence and the second correspondence by using the first correspondence receiving module and the second correspondence receiving module.

In a possible implementation, a system role updating module is configured to send system role update information to the second system, where the system role update information is used to indicate the second system to update a system role. When the advertisement system malfunctions, the advertisement system cannot send information to the first system and/or the network management system, or cannot receive information from the first system and/or the network management system. In this case, the network management system malfunctions. The network management system sends the system role update information to the second system when the network management system detects that the advertisement system malfunctions, where the system role update information is used to indicate the second system to update the role to the second system and the advertisement system. After the second system updates the role of the second system to the second system and the advertisement system, the second system may send, to the network management system, management information of the first system, for example, the first correspondence and/or the second correspondence. In this way, the network management system can continue to operate properly, thereby improving network reliability.

A network system is further provided. The network system includes a first system, a second system, and a network management system. The network system implements any one of the foregoing methods related to sending a management IP address.

A computer-readable storage medium is further provided. The storage medium stores at least one instruction, and the instruction is loaded and executed by a processor to implement any one of the foregoing methods related to sending a management IP address.

A computer program product is provided. The computer program product includes computer program code. When the computer program code is run on a computer, the computer is enabled to perform the methods in the foregoing aspects.

BRIEF DESCRIPTION OF DRAWINGS

FIG. 6 is a schematic diagram of an extension to the opaque LSA with the link state (LS) type 10 in the OSPFv2 protocol according to an embodiment of this application;

FIG. 7 shows a format of an opaque LSA in the OSPF version 3 (OSPFv3) protocol defined in RFC 4970;

FIG. 8 is a schematic diagram of an extension to the opaque LSA in the OSPFv3 protocol according to an embodiment of this application;

DESCRIPTION OF EMBODIMENTS

To make the objectives, technical solutions, and advantages of this application clearer, the following further describes this application in detail with reference to the accompanying drawings. It is clear that the described embodiments are merely some rather than all of the embodiments of this application.

Network architectures and service scenarios described in the embodiments of this application are used as examples to describe the technical solutions of this application, but this does not mean that this application is applicable only to the following embodiments. A person of ordinary skill in the art may know that, with the evolution of network architectures and emergence of new service scenarios, the technical solutions provided in this application are also applicable to similar technical problems.

Figure 1:
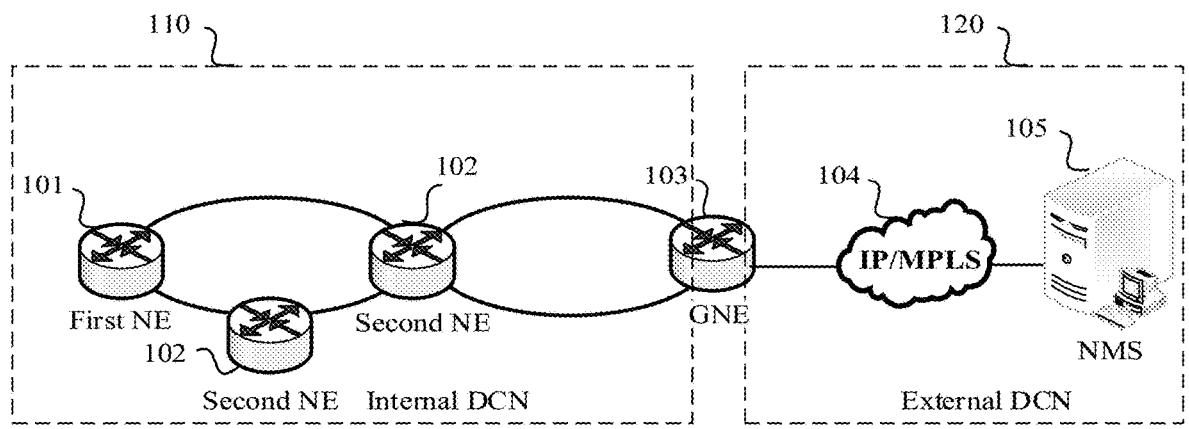
FIG. 1 is a schematic diagram of a network according to an embodiment of this application.

FIG. 1 is a schematic diagram of a network according to an embodiment of this application. A data communication network (DCN) is used to transmit OAM information between a network management system (NMS) and a network element (NE) or between a plurality of NEs. The DCN may be constructed and managed by carriers. The DCN network includes the NMS, the NEs, and/or a gateway network element (GNE). The GNE is a type of NE set by the NMS. The GNE provides a data forwarding function at a network layer or an application layer, and is connected to the NMS according to a network operation and maintenance protocol. In this case, the NMS may manage other NEs in the DCN by using the GNE. NEs are classified into first NEs and second NEs based on online statuses of the NEs. The online status is a status in which an NE can be operated, administrated, and maintained by the NMS after executing an NE online method procedure. The first NE is a type of NEs that are going to execute the NE online procedure or that are being executing the NE online procedure. The second NEs are a type of NEs that can be already operated, administrated, and maintained by the NMS. There are two types of DCN networking: an internal DCN and an external DCN. The internal DCN is a DCN in which NEs are connected through connection channels between the NEs, to transmit OAM information. The external DCN is a DCN in which the NMS needs to connect to NEs that are not located in a same site as the NMS is located, through an IP network or a Multiprotocol Label Switching (MPLS) network. As shown in FIG. 1, a DCN 100 includes an internal DCN 110 and an external DCN 120. The internal DCN 110 includes a first NE 101, a second NE 102, and a GNE 103. The external DCN 120 includes the GNE 103, an IP/MPLS network 104, and an NMS 105. The external DCN 120 is the DCN between the NMS and the GNE, as shown in FIG. 1. An online method procedure of an IPv4 address-based NE in the DCN includes the following steps: 1. After the first NE 101 is deployed in the internal DCN 110 and is powered on to be started, the first NE 101 generates a Network Element IP (NEIP) address based on an NE identifier (NEID). 2. The first NE 101 and the second NE 102 learn of NEIP addresses of each other through a negotiation process, and the first NE 101 releases a correspondence between an NEID and an NEIP address according to a routing protocol. 3. The GNE 103 discovers the correspondence released by the first NE 101, and reports the correspondence to the NMS 105. 4. The NMS 105 manages the first NE 101 according to a network management protocol, and the NEID and the NEIP address of the first NE 101. IP addresses are classified into IPv4 addresses and IPv6 addresses based on IP versions. IPv6 was first proposed for the reason that the IPv4 has limited address space, which hinders the development of the Internet. Therefore, IPv6 emerges to redefine address space to obtain sufficient IP address space and ensure the development of the Internet. A length of an IPv6 address is 128 bits, and provide almost unlimited IP addresses to users. As IPv6 addresses are gradually used, there is a transition that IPv6 addresses may be used for management IP address of the DCN network. With the development of the DCN network, the DCN network has changed from a dedicated network for carrying dedicated network management system services of carriers to enterprise intranets of carriers. In this case, the DCN network includes a large quantity of network NEs and servers, and a system including the NEs and the servers. With the development of the Internet of Things and wireless enterprise service terminals, there are more systems in enterprise intranets and various types of IP addresses. However, configuration of management IP addresses of the system increases network operation and maintenance (O & M) costs. Therefore, both carriers and enterprises require a management IP address sending method that can adapt to a plurality of types of IP addresses.

Figure 2:
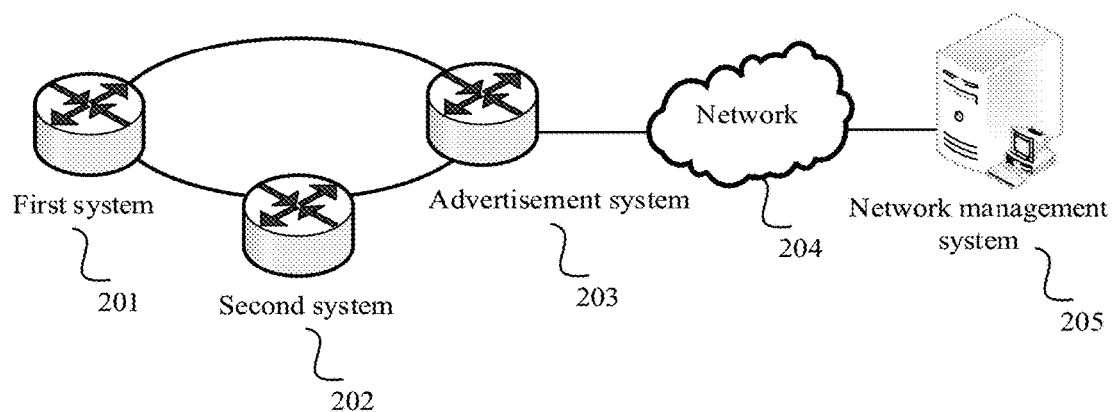
FIG. 2 is a schematic diagram of a network according to an embodiment of this application.

FIG. 2 is a schematic diagram of a network according to an embodiment of this application. The network 200 shown in FIG. 2 includes a first system 201, a second system 202, an advertisement system 203, a network 204, and a network management system 205. The first system 201, the second system 202, and the advertisement system 203 each may be a network including a plurality of devices, or may be one device. The device may be a forwarding device or a server. As shown in FIG. 2, the first system 201 has not been managed by the network management system 205 yet, and the first system 201 is in a first state. In some embodiments, the first system 201 corresponds to the first NE 101 shown in FIG. 1. The second system 202 has already been managed by the network management system 205, and the second system 202 is in a second state. In some embodiments, the second system 202 corresponds to the second NE 102 shown in FIG. 1. The advertisement system 203 has already been managed by the network management system 205, and the advertisement system 203 is in a second state. The advertisement system 203 supports to advertise management information of the first system 201 to the network management system 205. In some embodiments, the advertisement system 203 corresponds to the GNE 103 shown in FIG. 1. The management information is information that needs to be used when the network management system manages the first system or the second system. The network 204 is a bearer network of a network management protocol between the network management system 205 and the advertisement system 203. For example, the network 204 is an IP/MPLS network. In some embodiments, the network 204 corresponds to the IP/MPLS network 104 shown in FIG. 1. The network management system 205 is a system that operates, administrates, and maintains the network 200. In some embodiments, the network management system 205 corresponds to the NMS 105 shown in FIG. 1.

Figure 3:
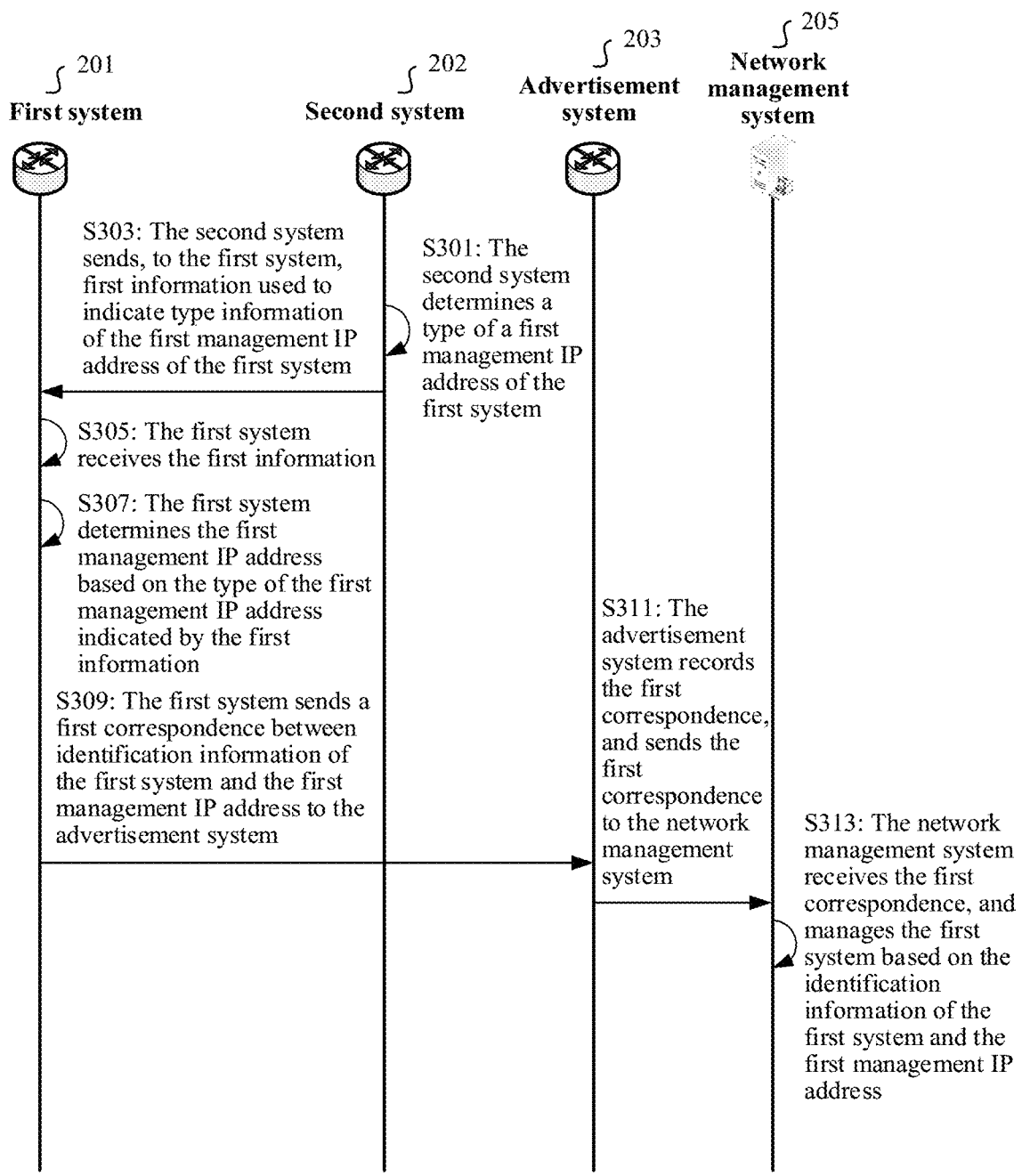
FIG. 3 is a flowchart of a method related to sending a management IP address according to an embodiment of this application.

An embodiment of this application provides a method related to advertising a management IP address. The method may be adapted to advertise a plurality of types of management IP addresses. FIG. 3 is a flowchart of a method related to advertising a management IP address according to an embodiment of this application.

S301: A second system determines a type of a first management IP address of a first system.

In some embodiments, the second system, for example, the second system 202, is a system that can be operated, administrated, and maintained by a network management system, for example, the network management system 205. The network management system 205 operates, administrates, and maintains the second system 202 based on a management IP address of the second system 202. Management IP addresses may be classified into IPv4 management IP addresses and IPv6 management IP addresses based on IP types of IP addresses. New types of addresses may emerge in subsequent technical development. In some embodiments, the network management system 205 manages the systems in a network based on IPv4 management IP addresses. In some embodiments, the network management system 205 manages the systems in a network based on IPv6 management IP addresses. The first management IP address is used for communication between the first system 201 and the network management system 205, and is also used for data communication between the first system 201 and one or more second systems in a network. If the first system 201 needs to enter a second state from a first state, the first system 201 needs to be discovered by the network management system 205, and is managed by the network management system 205 based on the first management IP address of the first system 201. The first system 201 needs to determine a type of the first management IP address used to communicate with the network management system 205 in the network in which the first system 201 is located. In some embodiments, the type of the first management IP address of the first system 201 is consistent with a type of a management IP address of the second system 202. The second system 202 determines the type of the first management IP address of the first system 201 based on the type of the management IP address of the second system 202. For example, if the type of the management IP address of the second system 202 is IPv4, the second system 202 determines that the type of the first management IP address of the first system 201 is also IPv4.

S303: The second system sends, to the first system, first information used to indicate the type of the first management IP address of the first system.

As described in S301, the second system 202 has already determined the type of the first management IP address of the first system 201 based on the type of the management IP address of the second system 202. After determining the type of the management IP address of the second system 202, the second system 202 sends the first information to the first system 201, where the first information is used to indicate the type of the first management IP address of the first system 201. The first information may directly or indirectly indicate the type of the first management IP address of the first system.

In some embodiments, before sending the first information to the first system 201, the second system 202 needs to obtain a MAC address of the first system 201. The second system 202 creates, based on the MAC address of the first system 201, a data packet used to send the first information. In some embodiments, there is a direct link between the second system 202 and the first system 201, and there is no system between two ends of the link. After the first system 201 is powered on to be started, when a physical interface that is of the first system 201 and that is connected to the second system 202 is in an enabled state, the first system 201 sends a request packet for the type of the first management IP address to the second system 202. A source MAC address of the request packet for the type of the first management IP address is a MAC address of the first system 201. The second system 202 receives the request packet for the type of the first management IP address from the first system 201, and obtains the source MAC address of the packet. The second system 202 encapsulates the first information into an Ethernet unicast packet. The packet is a response packet of the request packet for the type of the first management IP address of the first system 201. The second system 202 sends the response packet to the first system 201. A destination MAC address of the response packet is the MAC address of the first system 201. The response packet carries the first information used to indicate type information of the first management IP address of the first system 201.

In some embodiments, after the first system 201 is powered on to be started and the physical interface is in the enabled state, the first system 201 initiates a PPPoE negotiation request to the second system 202. A PPPoE Active Discovery Initiation (PADI) packet is a packet whose destination address is an Ethernet broadcast address and whose source address is the MAC address of the first system 201. In this case, the PADI packet sent by the first system 201 is equivalent to the request packet for the type of the first management IP address of the first system 201. After receiving the PADI packet sent by the first system 201, the second system 202 needs to send a PPPoE Active Discovery Offer (PADO) packet to the first system 201 according to a PPPoE negotiation procedure. Then, the first system 201 and the second system 202 complete an entire PPPoE negotiation procedure. In some embodiments, the second system 202 sends the first information to the first system 201 by executing a negotiation procedure in a PPPoE discovery phase. In some embodiments, the second system 202 sends the first information to the first system 201 by executing a negotiation procedure in a PPPoE session phase.

In some embodiments, the second system 202 sends the first information to the first system 201 by executing the negotiation procedure in the PPPoE discovery phase. The second system 202 encapsulates the determined type of the first management IP address of the first system 201 into an extension field of the PADO packet. After receiving the PADI packet sent by the first system 201, the second system 202 sends the PADO packet to the first system 201.

In some embodiments, the second system 202 sends the first information to the first system 201 by executing a negotiation procedure in a PPPoE session phase. The first system 201 and the second system 202 complete the negotiation procedure in the PPPoE discovery phase. The second system 202 has determined the type of the first management IP address of the first system 201 according to the operation of S301. If the type of the first management IP address is IPv4, the second system 202 sends an IP Control Protocol (IPCP) request packet to the first system 201. The IPCP request packet, used as the first information, indirectly indicates that the type of the first management IP address of the first system 201 is IPv4. If the type of the first management IP address is IPv6, the second system 202 sends an IPv6 Control Protocol (IPv6CP) request packet to the first system 201. The IPv6CP request packet, used as the first information, indirectly indicates that the type of the first management IP address of the first system 201 is IPv6.

S305: The first system receives the first information.

In some embodiments, the first system 201 receives a packet including the first information, and extracts the first information from the packet. The first information is information used to indicate the type of the first management IP address of the first system 201. The first system 201 obtains the type of the first management IP address.

In some embodiments, the second system 202 sends the first information to the first system 201 by executing the negotiation procedure in the PPPoE discovery phase. The second system 202 sends the PADO packet to the first system 201. The PADO packet includes the first information. The first system 201 receives the PADO packet sent by the second system 202, and obtains the type information of the first management IP address from the extension field of the PADO packet.

In some embodiments, the second system 202 sends the first information to the first system 201 by executing the negotiation procedure in the PPPoE session phase. The first system 201 and the second system 202 complete the negotiation procedure in the PPPoE discovery phase. The second system 202 has determined the type of the first management IP address of the first system 201 according to the operation of S301. If the type of the first management IP address is IPv4, the second system 202 sends an IPCP request packet to the first system 201. The first system 201 receives the IPCP request packet sent by the second system 202. The first system 201 confirms, based on the type of the IPCP request packet, that the first system 201 needs to perform IPCP negotiation with the second system 202 by using an IPv4 management IP address. If the type of the first management IP address is IPv6, the second system 202 sends an IPv6CP request packet to the first system 201. The first system 201 receives the IPv6CP request packet sent by the second system 202. The first system 201 confirms, based on the type of the IPv6CP request packet, that the first system 201 needs to perform IPv6CP negotiation with the second system 202 by using an IPv6 management IP address.

S307: The first system determines the first management IP address based on the type of the first management IP address indicated by the first information.

Figure 4:
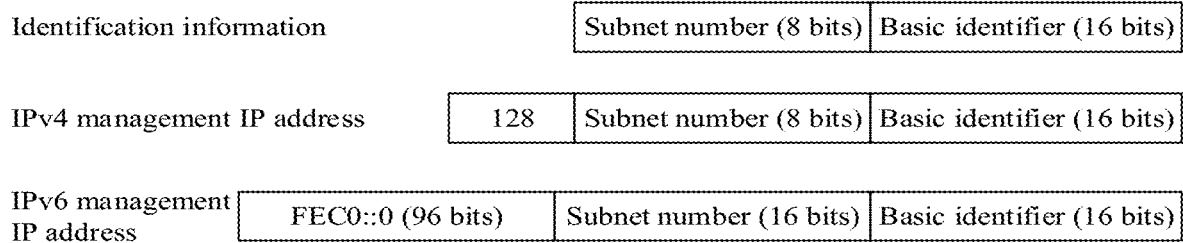
FIG. 4 is a schematic diagram of relationships between system identification information and management IP addresses according to an embodiment of this application.

The first system obtains the first information, and generates the first management IP address based on the type of the first management IP address indicated by the first information. In some embodiments, the first system 201 may generate an IPv4 management IP address and/or an IPv6 management IP address based on identification information of the first system 201. FIG. 4 is a schematic diagram of relationships between the identification information of the first system and management IP addresses according to this embodiment of this application. The first system 201 may determine, based on the obtained first information, to use an IPv4 management IP address and/or an IPv6 management IP address as the first management IP address. In some embodiments, the network uniquely identifies the system by using the identification information of the first system 201. The identification information of the first system 201 includes a 24-bit binary number, where the first eight binary digits represent a system subnet number, and the last 16 bits of the binary number represent basic identification information. The management IP address is used by the network management system 205 to manage a plurality of parts in the network 200, such as the first system 201, the second system 202, and the advertisement system 203. A relationship between an IPv4 management IP address and system identification information is as follows. The first eight binary digits of the IPv4 management IP address are fixed values, where a corresponding decimal value is 128, the $9^{th}$ to the $16^{th}$ binary digits are a subnet number included in the identification information, and the $17^{th}$ to the $32^{nd}$ binary digits are basic identification information included in the identification information. A relationship between an IPv6 management IP address and the system identification information is as follows. The first 96 binary digits of the IPv6 management IP address are fixed values, where a corresponding hexadecimal value is FEC0::0, the $97^{th}$ to $112^{th}$ binary digits are a subnet number included in the identification information, and the $113^{th}$ to the $128^{th}$ binary digits are basic identification information included in the identification information. In some embodiments, the IPv4 management IP address and the IPv6 management IP address of the system are obtained based on the correspondences between the system identification information and the management IP addresses shown in FIG. 4. For example, if the identification information of the first system 201 is 0x09BFF0, a subnet number of the identification information is 0x09, and basic identification information of the identification information is 0xBFF0. In this case, the IPv4 management IP address of the first system is 128.09.191.240, and the IPv6 management IP address is FEC0::09:BFF0. For example, when the first information received by the first system 201 indicates that the type of the first management IP address is IPv4, the first management IP address of the first system 201 is the IPv4 management IP address 128.09. 191.240. For example, when the first information indicates that the type of the first management IP address is IPv6, the first management IP address of the first system 201 is the IPv6 management IP address FEC0::09: BFF0.

In some embodiments, the first system 201 has generated one or more management IP addresses before receiving the first information. The first system 201 determines the first management IP address from the one or more generated management IP addresses based on the first information. For example, the first system 201 has generated an IPv4 management IP address and an IPv6 management IP address. If the first information received by the first system 201 indicates that the type of the first management IP address is IPv6, the first management IP address determined by the first system 201 is the IPv6 management IP address.

In some embodiments, the first system 201 has not generated management IP addresses before receiving the first information. The first system 201 newly generates, based on the type of the first management IP address indicated by the received first information, a first management IP address that matches the type. For example, the first system 201 has not generated any management IP address. If the type of the first management IP address indicated by the first information received by the first system 201 is IPv6, the first system 201 directly generates the IPv6 management IP address according to a management IP address generation principle, for example, based on the correspondence between system identification information and a management IP address shown in FIG. 4.

In some embodiments, the first system 201 generates the first management IP address based on the type of the first management IP address. The first system 201 and the second system 202 confirm, according to the PPPoE procedure, the first management IP address used by the first system 201.

In some embodiments, the first system 201 indicates, by using a PPPoE Active Discovery Request (PADR) packet, the second system 202 to use the type of the first management IP address. The first system 201 has determined the first management IP address based on the type of the first management IP address. The first system 201 and the second system 202 confirm, through negotiation in the PPPoE session phase, the first management IP address used by the first system 201. A PPPoE session negotiation process mainly includes three negotiation phases: Link Control Protocol (LCP) negotiation, user authentication negotiation, and NCP negotiation. The first system 201 and the second system 202 complete the PPPoE LCP negotiation and the PPPoE authentication negotiation, and start the PPPoE NCP negotiation. A main function of the NCP negotiation is to negotiate network-layer parameters of a PPP packet, such as an IPCP and an IPv6CP. In some embodiments, the first system 201 and the second system 202 perform negotiation according to the IPCP. If the type of the first management IP address confirmed by the first system 201 is IPv4, the first system 201 completes IPCP negotiation with the second system 202 based on an IPv4 management IP address. If the type of the first management IP address confirmed by the first system 201 is IPv6, the first system 201 completes IPv6CP negotiation with the second system 202 based on an IPv6 management IP address. After performing the foregoing operations, the first system 201 determines the first management IP address based on the type of the first management IP address indicated by the first information, and the first system 201 completes the PPPoE negotiation operation procedure with the second system 202.

In some embodiments, the second system 202 sends the first information to the first system 201 by executing the negotiation procedure in the PPPoE session phase. When the first system 201 and the second system 202 have completed the negotiation procedure in the PPPoE discovery phase, the second system 202 has determined the type of the first management IP address of the first system 201 based on the operation of S301. If the type of the first management IP address is IPv4, the second system 202 sends an IPCP request packet to the first system 201. The IPCP request packet indirectly indicates that the first system 201 needs to use an IPv4 management IP address. After receiving the IPCP request packet sent by the second system 202, the first system 201 confirms that the type of the first management IP address is IPv4. The first system 201 confirms, based on the address type IPv4, a first management IP address whose type is IPv4, and completes IPCP negotiation with the second system 202 by using the first management IP address. If the type of the first management IP address is IPv6, the second system 202 sends an IPv6CP request packet to the first system 201. The IPv6CP request packet indirectly indicates that the first system 201 needs to use an IPv6 management IP address. After receiving the IPv6CP request packet sent by the second system 202, the first system 201 confirms that the type of the first management IP address is IPv6. Then, the first system 201 determines a first management IP address whose type is IPv6, and completes IPv6CP negotiation with the second system 202 by using the first management IP address.

S309: The first system sends a first correspondence between the identification information of the first system and the first management IP address to the advertisement system.

In some embodiments, after the first system 201 determines the first management IP address, the first system 201 needs to send the first correspondence between the identification information of the first system 201 and the first management IP address to the advertisement system 203. The advertisement system 203 is configured to advertise management information of the first system 201 to the network management system 205. The management information includes the identification information of the system and a management IP address of the system. The first correspondence is a correspondence between the identification information of the first system and the first management IP address of the first system. The first correspondence may be a direct correspondence or an indirect correspondence. The network management system may manage the system based on the first correspondence. In some embodiments, the advertisement system may establish a routing relationship between the advertisement system and the first system based on the first correspondence. After determining the first management IP address, the first system 201 sends the first correspondence between the identification information of the first system 201 and the first management IP address to the advertisement system 203. In some embodiments, the first system 201 and the advertisement system 203 are directly connected or are located in a layer 2 network. In this case, the first system 201 broadcasts information about the first correspondence to the advertisement system by using an Ethernet broadcast packet. In some embodiments, the first system 201 and the advertisement system 203 are not directly connected, and the first system 201 and the advertisement system 203 are located in a layer 3 network. The first system 201 sends the information about the first correspondence to the advertisement system 203 by using a data packet applicable to the layer 3 network. For example, the first system 201 may send the information about the first correspondence by using a layer 3 routing protocol-based flood packet.

In some embodiments, after determining the first management IP address, the first system 201 creates a logical interface in the first system 201. The logical interface is configured for exchange of network management information of the first system 201, and configured for isolation from service data after the first system 201 goes online, without affecting exchange of the service data. The logical interface is in an enabled state, and is added to an OSPF virtual private network (VPN) instance A. An OSPF routing neighbor is established at the logical interface. The advertisement system 203 creates a logical interface, adds the logical interface to the OSPF VPN instance A, and establishes an OSPF routing neighbor at the logical interface. After enabling an OSPF routing protocol function, the first system 201 may perform, based on a routing protocol extension, route flooding on the advertisement system 203 that is located in a same OSPF area as the first system 201 is located. The first system 201 advertises the information about the first correspondence to the advertisement system 203 through route flooding.

In some embodiments, the first system 201 floods, based on an extension to the OSPF routing protocol, the first correspondence to the advertisement system 203 the same OSPF area in which the first system 201 is located. The first correspondence is encapsulated into an extension field of an opaque LSA of the OSPF routing protocol, and is sent to the advertisement system 203 in the flooding area through OSPF route flooding.

A LSA is generated by each system that runs the OSPF. The OSPF routing protocol is a link-state routing protocol. The link state is a description about an interface in a system and a neighbor relationship of the system. All descriptions about link state information in the OSPF are encapsulated into LSAs for releasing. The link state information is carried by different types of LSAs for propagation in a network. The opaque LSA is a type of LSA that can be directly used by the OSPF protocol or indirectly used by other applications by distributing information to the entire OSPF area. The OSPF protocol is a routing protocol for providing routing functions based on the IP protocol. OSPFv2 is a routing protocol that supports IPv4, and OSPFv3 is a routing protocol that supports IPv6.

Figure 5:
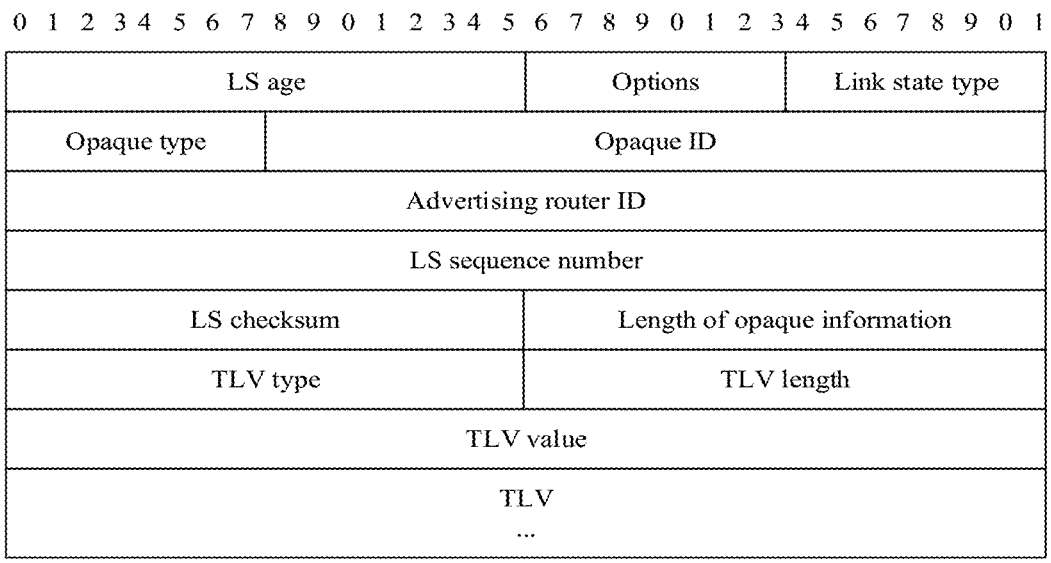
FIG. 5 shows a format of an opaque LSA in the OSPF version 2 (OSPFv2) protocol defined in Request for Comments (RFC) 4970.

Internet Engineering Task Force (IETF) RFC 4970 defines extensions to advertise optional routing informational capabilities via opaque OSPFv2 LSAs and OSPFv3 LSAs. FIG. 5 shows a format of an OSPFv2 opaque LSA defined in RFC 4970. The OSPFv2 opaque LSA include link state types 9, 10, and 11. For flooding scope, a type-9 opaque LSA is only link-scoped, a type-10 opaque LSA is area-scoped, and a type-11 opaque LSA is autonomous system (AS)-scoped. In some embodiments, to-be-advertised information may be carried in a type-length-value (TLV) field of the opaque LSA. A format of the TLV field includes a TLV type, a TLV length, and a TLV value. FIG. 7 shows a format of an OSPFv3 opaque LSA defined in RFC 4970. A function code in an LSA type field in the OSPFv3 opaque LSA is 12. In some embodiments, to-be-advertised information may be carried in a TLV field of the opaque LSA.

In some embodiments, if the type of the first management IP address in the first correspondence sent by the first system 201 to the advertisement system 203 is IPv4, the first system 201 advertises the first correspondence of the first system 201 to the advertisement system 203 in a route flooding area based on an extended TLV field of the opaque LSA with the LS type 10 in the OSPFv2 routing protocol. The first correspondence is encapsulated into the extended TLV field of the opaque LSA with the LS type 10 in the OSPFv2 routing protocol. FIG. 6 is a schematic diagram of an extension to the opaque LSA with the LS type 10 in the OSPFv2 protocol according to an embodiment of this application. Fields in a packet format of the extended opaque LSA with the LS type 10 related to this application include: 1. the LS type 10, 2. an opaque type set to a fixed value, for example, 200, 3. an opaque ID set to a fixed value, for example, 0, 4. a TLV type in the extended TLV field set to a fixed value, for example, 100, 5. a TLV value in the extended TLV field, including system identification information (3 bytes), IPv4 mask bits (1 byte), and an IPv4 management IP address (4 bytes), and 6. a TLV length with 8 bytes in the extended TLV field.

In some embodiments, if the type of the first management IP address in the first correspondence sent by the first system 201 to the advertisement system 203 is IPv6, the first system 201 advertises the first correspondence of the first system 201 to the advertisement system 203 in a route flooding area based on an extended TLV field of the opaque LSA in the OSPFv3 routing protocol. The first correspondence is encapsulated into the extended TLV field of the opaque LSA in the OSPFv3 routing protocol, where an LSA type of the opaque LSA has a function code of 12. FIG. 8 is a schematic diagram of an extension to the opaque LSA in the OSPFv3 protocol according to an embodiment of this application. Fields in a packet format of the extended opaque LSA related to this application include: 1. the function code of 12 in the LSA type, 2. an LS ID set to a fixed value, for example, 0, 3. a TLV type in the extended TLV field set to a fixed value, for example, 100, 4. a TLV value in the extended TLV field, including system identification information (3 bytes), IPv6 prefix length (1 byte) and an IPv6 management IP address (16 bytes), and 5. a TLV length with 20 bytes in the extended TLV field.

Figure 9:
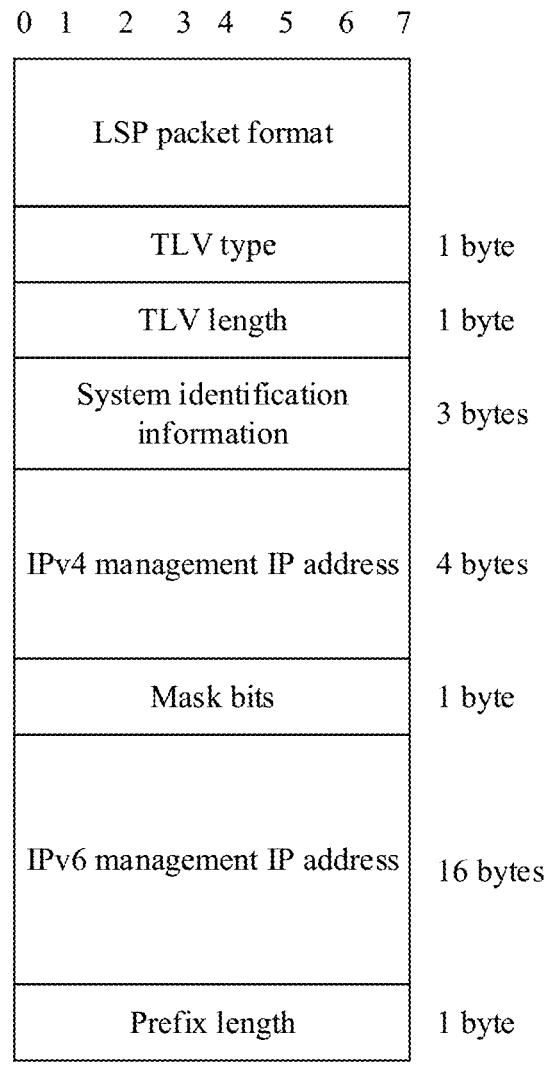
FIG. 9 is a schematic diagram of an extended TLV field of an IS-IS link state packet (LSP) packet according to an embodiment of this application.

In some embodiments, the first system 201 advertises the first correspondence of the first system 201 to the advertisement system 203 in a route flooding area according to an IS-IS routing protocol extension. The first correspondence is carried in an extended TLV field of an LSP of the IS-IS routing protocol, and is sent to the advertisement system 203 in the flooding area through route flooding. The LSP packet is used for exchanging link state information by using IS-IS routing. The extended TLV field is carried in a variable-length area of the LSP packet. FIG. 9 shows an extended TLV field of an IS-IS LSP packet defined in RFC 7356. In some embodiments, the LSP carries the extended TLV field in a variable-length area. A TLV type in the extended TLV field is defined as a fixed value. For example, the TLV type in the extended TLV field is 300. A TLV value in the extended TLV field includes: system identification information (3 bytes), an IPv4 management IP address (4 bytes), IPv4 mask bits (1 byte), an IPv6 management IP address (16 bytes), and a prefix length (1 byte). A TLV length in the extended TLV field is 25 bytes.

S311: The advertisement system records the first correspondence, and sends the first correspondence to the network management system.

In some embodiments, the advertisement system 203 receives the first correspondence sent by the first system 201, records the first correspondence, and sends the first correspondence to the network management system 205. The advertisement system 203 may send the first correspondence according to a network management protocol or through an API supported by the network management system 205.

S313: The network management system obtains the first correspondence, and manages the first system based on the identification information of the first system and the first management IP address.

In some embodiments, the network management system 205 receives, according to the network management protocol or through the API, the first correspondence sent by the advertisement system 203. After receiving the first correspondence, the network management system 205 records the first correspondence. In some embodiments, the network management system 205 may record the first correspondence in a format described in Table 1, to generate a first correspondence table. According to the first correspondence table, the network management system 205 may manage the first system or the second system based on the identification information of the first system or identification information of the second system. For example, the network management system 205 may find a management IP address of a corresponding system based on identification information in a system topology relationship diagram presented based on the identification information. The network management system 205 logs in to the specific system based on the management IP address to perform OAM operations.

TABLE 1

| Identification information of the first/second system | Management IP address | IP address type |
|---|---|---|
| 0x09BFF0 | 128.9.191.240 | IPv4 |
| 0x09BF10 | 128.9.191.16 | IPv4 |

In some embodiments, the network management system 205 checks a source MAC address of a data packet after receiving the data packet including the first correspondence. The source MAC address is checked in the following manner. The source MAC address is compared with a MAC address that is of the advertisement system 203 and that is set by the network management system 205, and if the source MAC address is the same as the MAC address of the advertisement system, the network management system 205 receives the first correspondence, or if the source MAC address is different from the MAC address of the advertisement system, it indicates that the data packet is sent not by the advertisement system 203 set by the network management system 205, and the data packet is discarded. Checking the source MAC address of the data packet can avoid the following case. The network management system 205 receives a data packet sent by a system that is not the advertisement system or by a counterfeit advertisement system, and the network management system 205 maintains a correspondence between incorrect system identification information and the first management IP address, causing a network management fault.

Figure 10:
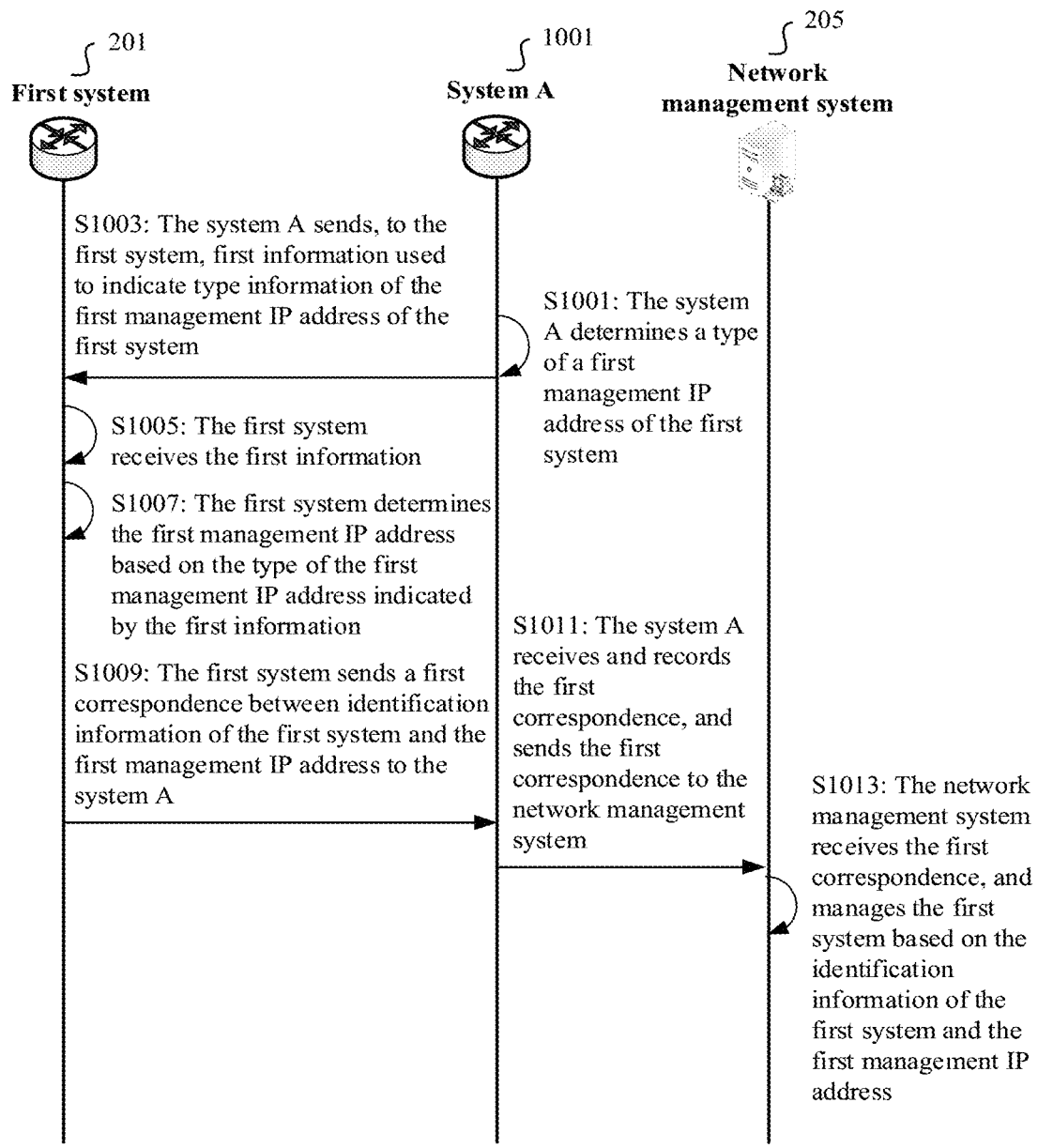
FIG. 10 is a flowchart of a method related to sending a management IP address according to an embodiment of this application.

In some embodiments, the second system and the advertisement system may be a same system, for example, a system A 1001 shown in FIG. 10. The system A 1001 is a system with two system roles and functions, that is, the system A 1001 has system roles and functions of the second system and the advertisement system. In this case, the method shown in FIG. 10 includes the following steps.

S1001: The system A determines a type of a first management IP address of a first system.

In some embodiments, the system A 1001 is a system that can be operated, administrated, and maintained by a network management system 205. The system A 1001 is a system with two system roles and functions, that is, the system A 1001 has system roles and functions of the second system and the advertisement system. The network management system 205 operates, administrates, and maintains the system A 1001 based on a management IP address of the system A 1001. Management IP addresses may be classified into IPv4 management IP addresses and IPv6 management IP addresses based on IP types of IP addresses. New types of addresses may emerge in subsequent technical development. In some embodiments, the network management system 205 may manage the system in a network based on IPv4 management IP addresses. In some embodiments, the network management system 205 may manage the system in a network based on IPv6 management IP addresses. The first management IP address is used for communication between the first system 201 and the network management system 205, and is also used for data communication between the first system 201 and one or more second systems in the network. If the first system 201 needs to enter a second state from a first state, the first system 201 needs to be discovered by the network management system 205, and is managed by the network management system 205 based on the first management IP address of the first system 201. The first system 201 needs to determine a type of the first management IP address used to communicate with the network management system 205 in the network in which the first system 201 is located. In some embodiments, the type of the first management IP address of the first system 201 is consistent with a type of a management IP address of the system A 1001. The system A 1001 determines the type of the first management IP address of the first system 201 based on the type of the management IP address of the system A 1001. For example, if the type of the management IP address of the system A 1001 is IPv4, the system A 1001 determines that the type of the first management IP address of the first system 201 is also IPv4.

S1003: The system A sends, to the first system, first information used to indicate type information of the first management IP address of the first system.

The first information is information that is used to indicate the type of the first management IP address of the first system 201 and that is sent by the system A to the first system 201. As described in S1001, the system A 1001 has already determined the type of the first management IP address of the first system 201 based on the type of the management IP address of the system A 1001. The first system 201 needs to obtain the first information, so as to determine a management IP address of the first system based on the first information. After determining the type of the management IP address of the system A 1001, the system A 1001 sends the first information to the first system 201, where the first information is used to indicate the type of the first management IP address of the first system 201.

In some embodiments, before sending the first information to the first system 201, the system A 1001 needs to obtain a MAC address of the first system 201. The system A 1001 creates, based on the MAC address of the first system 201, a data packet used to send the first information. In some embodiments, there is a direct link between the system A 1001 and the first system 201, and there is no system between the link. After the first system 201 is powered on to be started, when a physical interface that is of the first system 201 and that is connected to the system A 1001 is in an enabled state, the first system 201 sends a request packet for the type of the first management IP address to the system A 1001. A source MAC address of the request packet for the type of the first management IP address is the MAC address of the first system 201. The system A 1001 receives the request packet for the type of the first management IP address sent by the first system 201, and obtains the source MAC address of the packet. The system A 1001 encapsulates the first information into an Ethernet unicast packet as a response packet for the request packet for the type of the first management IP address, and sends the response packet. A destination MAC address of the response packet is the MAC address of the first system 201. Data of the response packet carries the first information used to indicate the type information of the first management IP address of the first system 201.

S1005: The first system receives the first information.

In some embodiments, the first system 201 receives a packet including the first information, and extracts the first information from the packet. The first information indicates the type information of the first management IP address of the first system 201. The first system 201 obtains the type of the first management IP address.

S1007: The first system determines the first management IP address based on the type of the first management IP address indicated by the first information.

The first system obtains the first information, and generates the first management IP address based on the type of the first management IP address indicated by the first information. In some embodiments, the first system 201 may generate an IPv4 management IP address and an IPv6 management IP address based on identification information of the first system 201. FIG. 4 is a schematic diagram of correspondences between identification information of the first the system and management IP addresses according to this embodiment of this application. FIG. 4 shows a correspondence between system identification information and an IPv4 management IP address and a correspondence between the system identification information and an IPv6 management IP address. The first system 201 may determine, based on the obtained first information that is used to indicate the type of the first management IP address, to use the IPv4 management IP address or the IPv6 management IP address as the first management IP address. In some embodiments, the network uniquely identifies the system by using the identification information of the first system 201. In some embodiments, the identification information of the first system 201 includes a 24-bit binary number, where the first eight binary digits represent a system subnet number, and the last 16 bits of the binary number represent basic identification information. The correspondence between the IPv4 management IP address and the system identification information is as follows. The first eight binary digits of the IPv4 management IP address are fixed values, where a corresponding decimal value is 128, the $9^{th}$ to the $16^{th}$ binary digits are a subnet number included in the identification information, the $17^{th}$ to the $32^{nd}$ binary digits are basic identification information included in the identification information. The correspondence between the IPv6 management IP address and the system identification information is as follows. The first 96 binary digits of the IPv6 management IP address are fixed values, where a corresponding hexadecimal value is FEC0::0, the $97^{th}$ to $112^{th}$ binary digits are a subnet number included in the identification information, the $113^{th}$ to the $128^{th}$ binary digits are basic identification information included in the identification information. In some embodiments, the IPv4 management IP address and the IPv6 management IP address of the system are obtained based on the correspondences between the system identification information and the management IP addresses in FIG. 4. When the first information received by the first system 201 indicates that the type of the first management IP address is IPv4, the first management IP address of the first system 201 is an IPv4 management IP address. When the first information indicates that the type of the first management IP address is IPv6, the first management IP address of the first system 201 is an IPv6 management IP address.

In some embodiments, the first system 201 has generated one or more management IP addresses before receiving the first information. The first system 201 determines the first management IP address from the one or more generated management IP addresses based on the first information. For example, the first system 201 has generated an IPv4 management IP address and an IPv6 management IP address. If the first information received by the first system 201 indicates that the type of the first management IP address is IPv6, the first management IP address determined by the first system 201 is the IPv6 management IP address.

In some embodiments, the first system 201 has not generated one or more management IP addresses before receiving the first information. The first system 201 newly generates, based on the type of the first management IP address indicated by the received first information, a first management IP address that matches the type. For example, the first system 201 has not generated any management IP address. If the type of the first management IP address indicated by the first information received by the first system 201 is IPv6, the first system 201 directly generates the IPv6 management IP address according to a management IP address generation principle, for example, based on the correspondence between system identification information and a management IP address shown in FIG. 4.

S1009: The first system sends a first correspondence between the identification information of the first system and the first management IP address to the system A.

In some embodiments, after the first system 201 determines the first management IP address, the first system 201 needs to send the first correspondence between the identification information of the first system 201 and the first management IP address to the system A 1001. The system A 1001 is configured to advertise management information of the first system 201 to the network management system 205. The management information is management information that needs to be used when the network management system 205 manages the first system 201. The management information includes the identification information and the management IP addresses of the system, and the first correspondence is a correspondence between the identification information of the first system and the first management IP address of the first system. Based on the first correspondence, a system recording or storing the first correspondence may associate the first management IP address based on the identification information or associate the identification information based on the first management IP address. The first correspondence may be a direct correspondence or an indirect correspondence. After determining the first management IP address, the first system 201 sends the first correspondence between the identification information of the first system 201 and the first management IP address to the advertisement system 203. In some embodiments, the first system 201 and the system A 1001 are directly connected or are located in a layer 2 network. In this case, the first system 201 broadcasts information about the first correspondence to the advertisement system by using an Ethernet broadcast packet. In some embodiments, the first system 201 and the system A 1001 are not directly connected, and are located in a layer 3 network. The first system 201 sends the information about the first correspondence to the system A 1001 by using a data packet applicable to the layer 3 network. For example, the first system 201 may send the information about the first correspondence by using a layer 3 routing protocol-based flood packet.

S1011: The system A records the first correspondence, and sends the first correspondence to the network management system.

In some embodiments, the system A 1001 receives the first correspondence sent by the first system 201, records the first correspondence, and sends the first correspondence to the network management system 205. The system A 1001 may send the first correspondence according to a network management protocol or through an API supported by the network management system 205.

In some embodiments, after receiving the first correspondence sent by the first system 201, the system A 1001 checks a type of the first management IP address in the first correspondence. For example, the system A 1001 compares the type of the first management IP address in the first correspondence with the type of a first management IP address determined by the system A 1001. If the type of the first management IP address in the first correspondence is the same as the type of the first management IP address determined by the system A 1001, it indicates that the first system 201 determines the first management IP address based on the type of the first management IP address indicated by the first information that is sent by the system A 1001. If the type of the first management IP address in the first correspondence is different from the type of the first management IP address determined by the system A 1001, it indicates that the first system 201 determines the first management IP address not based on the type of the first management IP address indicated by the first information that is sent by the system A 1001, and the first system 201 needs to re-determine a first management IP address.

S1013: The network management system obtains the first correspondence, and manages the first system based on the identification information of the first system and the first management IP address.

In some embodiments, the network management system 205 receives, according to the network management protocol or through the API, the first correspondence sent by the system A 1001. After receiving the first correspondence, the network management system 205 records the first correspondence. In some embodiments, the network management system 205 may record the first correspondence in a format described in Table 1, to generate a first correspondence table. According to the first correspondence table, the network management system 205 may manage the first system or the second system based on the identification information of the first system or identification information of the second system.

In some embodiments, the network management system 205 checks a source MAC address of a data packet after receiving the data packet including the first correspondence. The source MAC address is checked in the following manner. The source MAC address is compared with a MAC address that is of the system A 1001 and that is set by the network management system 205, and if the source MAC address is the same as the MAC address of the system A, the network management system 205 obtains the first correspondence, or if the source MAC address is different from the MAC address of the system A, it indicates that the data packet is sent not by the system A 1001 set by the network management system 205, and the data packet is discarded. Checking the source MAC address of the data packet can avoid the following case. The network management system 205 receives a data packet sent by a system that is not the system A or by a counterfeit system A, and the network management system 205 maintains a correspondence between incorrect system identification information and the first management IP address, causing a network management fault.

Figure 11:
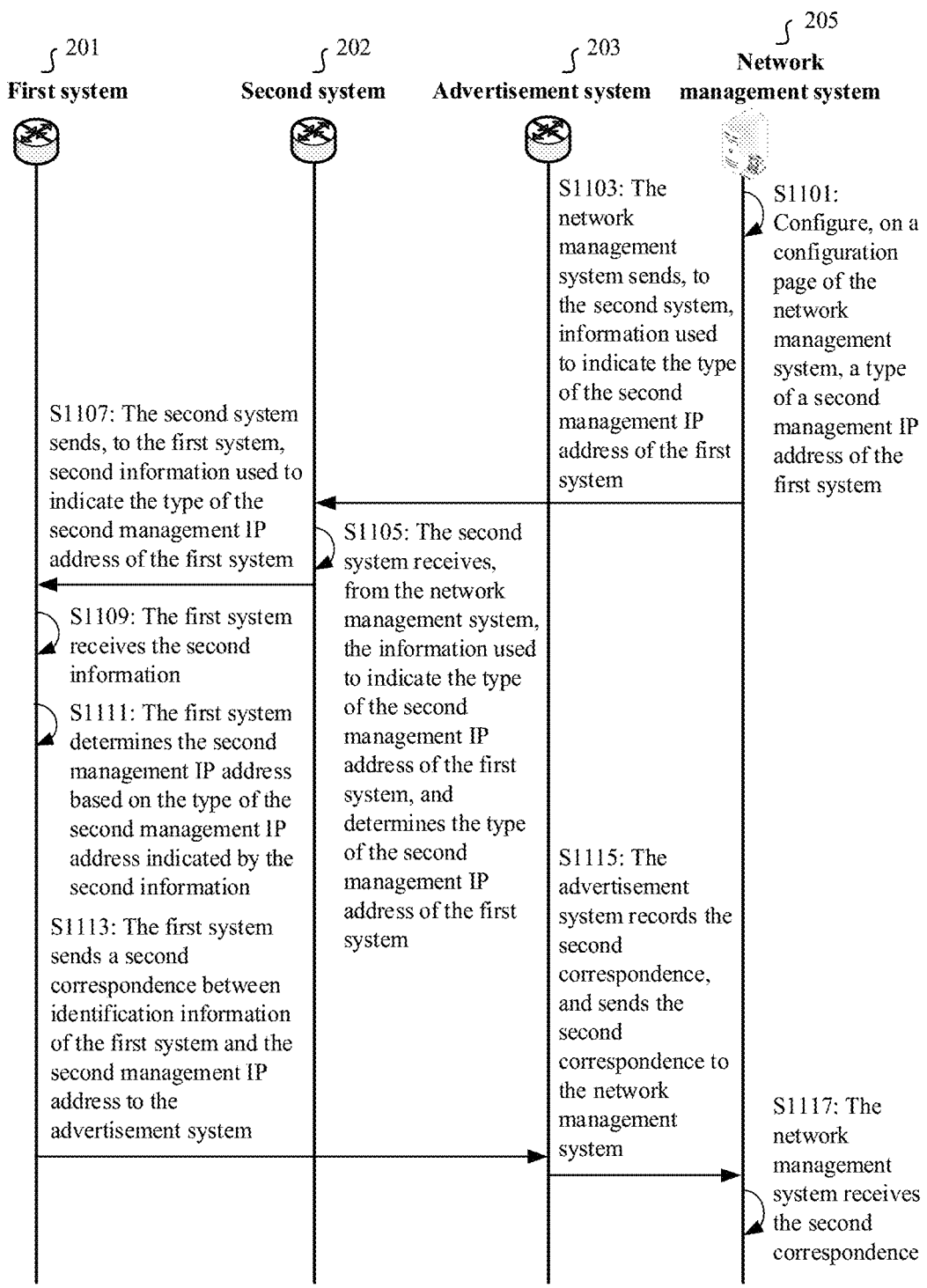
FIG. 11 is a flowchart of a method related to sending a management IP address according to an embodiment of this application.

In some embodiments, the network management system 205 supports to perform OAM on a system by using a switching candidate management IP address of the first system or a switching candidate management IP address of the second system. The alternative switching address is a management IP address used when a management IP address of the network needs to be switched. A management IP address needs to be switched in the following scenarios. The network management system needs to switch a type of a management IP address in a live network. For example, the network management system 205 uses an IPv4 management IP address in the live network but the network management system 205 needs to use an IPv6 management IP address subsequently, the network management system 205 needs to switch a type of a management IP address. When a management IP address in the live network that was available cannot be used, the network management system 205 tries to switch to an alternative switching address to continue to manage the system. When a management IP address that is being used by the first system 201 or the second system 202 cannot be normally used, or when the network management system 205 needs to switch a type of a management IP address of the entire network or a part of the network, the network management system 205 may use an alternative switching address of the system to continue to perform OAM on the system in the network. According to a method shown in FIG. 11, an alternative switching address that can be used for system OAM may be provided for the network management system 205.

S1101: Configure, on a configuration page of a network management system, a type of a second management IP address of a first system.

In some embodiments, the network management system 205 supports configuration of an alternative switching address. For example, a network administrator configures, on the configuration page of the network management system 205, an IP address type of the alternative switching address of the first system. The second management IP address is the alternative switching address of the first system. The network management system 205 obtains the type of the second management IP address by configuring the network management system 205.

S1103: The network management system sends, to a second system, information used to indicate the type of the second management IP address of the first system.

In some embodiments, the network management system 205 has configured the type of the second management IP address by performing the operation of S1101. The network management system 205 needs to send the information about the type of the second management IP address to the second system 202. The network management system 205 sends, to the second system 202, the information used to indicate the type of the second management IP address of the first system 201. In some embodiments, the network management system 205 sends, according to a network management protocol or through an API supported by the second system 202, the information used to indicate the type of the second management IP address of the first system.

S1105: The second system receives, from the network management system, the information used to indicate the type of the second management IP address of the first system, and determines the type of the second management IP address of the first system.

In some embodiments, the second system 202 receives, from the network management system 205 according to the network management protocol or through the supported API, the information used to indicate the type of the second management IP address of the first system 201. After obtaining the information used to indicate the type of the second management IP address of the first system 201, the second system 202 determines the type of the second management IP address of the first system 201.

S1107: The second system sends, to the first system, second information used to indicate the type of the second management IP address of the first system.

In some embodiments, after receiving, from the network management system 205, the information used to indicate the type of the second management IP address of the first system 201, the second system 202 determines the type of the second management IP address of the first system 201. The second information is information that is used to indicate the type of the second management IP address of the first system 201 and that is sent by the second system 202 to the first system 201. The first system 201 needs to obtain the second information, and the first system 201 determines the alternative switching address of the first system 201 based on the second information. After determining the type of the second management IP address of the first system 201, the second system 202 sends the second information to the first system 201, where the second information is used to indicate the type of the second management IP address of the first system 201. For a method for sending the second information by the second system 202 to the first system 201, refer to the method for sending the first information by the second system 202 to the first system 201.

In some embodiments, the second system 202 receives a request packet for the type of the second management IP address of the first system 210, where the second information is information that is used to indicate the type of the second management IP address of the first system 201 and that is sent by the second system 202 to the first system 201. After the first system 201 is powered on to be started, when a physical interface that is of the first system 201 and that is connected to the second system 202 is in an enabled state, the first system 201 sends a request packet for the type of the second management IP address to the second system 202. A source MAC address of the request packet for the type of the second management IP address is a MAC address of the first system 201. The second system 202 receives, from the first system 201, the request packet for the type of the second management IP address, and obtains the source MAC address of the packet. The second system 202 encapsulates the second information into an Ethernet unicast packet. The packet is a response packet of the request packet for the type of the second management IP address of the first system 201. The second system 202 sends the response packet to the first system 201. A destination MAC address of the response packet is the MAC address of the first system 201. The response packet carries the second information used to indicate type information of the second management IP address of the first system 201.

In some embodiments, after the first system 201 is powered on to be started and the physical interface is in the enabled state, the first system 201 initiates a PPPoE negotiation request to the second system 202. In some embodiments, the second system 202 sends the second information to the first system 201 by executing a negotiation procedure in a PPPoE discovery phase. In some embodiments, the second system 202 sends the second information to the first system 201 by executing a negotiation procedure in a PPPoE session phase.

S1109: The first system receives the second information.

In some embodiments, the first system 201 receives a packet including the second information, and extracts the second information from the packet. The second information indicates type information of the second management IP address of the first system 201. The first system 201 obtains the type of the second management IP address.

S1111: The first system determines the second management IP address based on the type of the second management IP address indicated by the second information.

The first system obtains the second information, and generates the second management IP address based on the type of the second management IP address indicated by the second information. In some embodiments, the first system 201 may generate an IPv4 management IP address and/or an IPv6 management IP address based on identification information of the first system 201. FIG. 4 is a schematic diagram of relationships between the identification information of the first system and management IP addresses according to this embodiment of this application. The first system 201 may determine, based on the obtained second information that is used to indicate the type of the second management IP address, to use an IPv4 management IP address or an IPv6 management IP address as the second management IP address. In some embodiments, the network uniquely identifies the system by using the identification information of the first system 201. In some embodiments, the identification information of the first system 201 includes a 24-bit binary number, where the first eight binary digits represent a system subnet number, and the last 16 bits of the binary number represent basic identification information. A relationship between an IPv4 management IP address and system identification information is as follows. The first eight binary digits of the IPv4 management IP address are fixed values, where a corresponding decimal value is 128, the $9^{th}$ to the $16^{th}$ binary digits are a subnet number included in the identification information, the $17^{th}$ to the $32^{nd}$ binary digits are basic identification information included in the identification information. A relationship between an IPv6 management IP address and the system identification information is as follows. The first 96 binary digits of the IPv6 management IP address are fixed values, where a corresponding hexadecimal value is FEC0: 0, the $97^{th}$ to $112^{th}$ binary digits are a subnet number included in the identification information, the $113^{th}$ to the $128^{th}$ binary digits are basic identification information included in the identification information. In some embodiments, the IPv4 management IP address and the IPv6 management IP address of the system are obtained based on the relationships between the system identification information and the management IP addresses in FIG. 4. When the second information received by the first system 201 indicates that the type of the second management IP address is IPv4, the second management IP address of the first system 201 is an IPv4 management IP address. When the second information indicates that the second management IP address type is IPv6, the second management IP address of the first system 201 is an IPv6 management IP address.

In some embodiments, the first system 201 has generated one or more alternative switching addresses before receiving the second information. The first system 201 determines the second management IP address from the one or more generated alternative switching addresses. For example, the first system 201 has generated an IPv4 management IP address and an IPv6 management IP address. If the second information received by the first system 201 indicates that the type of the second management IP address is IPv6, the second management IP address determined by the first system 201 is the IPv6 management IP address.

In some embodiments, the first system 201 has not generated alternative switching addresses before receiving the second information. The first system 201 newly generates, based on the type of the second management IP address indicated by the received second information, a second management IP address that matches the type. For example, the first system 201 has not generated any alternative switching IP address. If the type of the second management IP address indicated by the second information received by the first system 201 is IPv6, the first system 201 directly generates the IPv6 management IP address according to a management IP address generation principle, for example, based on the correspondence between system identification information and a management IP address shown in FIG. 4.

S1113: The first system sends a second correspondence between the identification information of the first system and the second management IP address to an advertisement system.

In some embodiments, after the first system 201 determines the second management IP address, the first system 201 needs to send the second correspondence between the identification information of the first system 201 and the second management IP address to the advertisement system 203. The advertisement system 203 is configured to advertise management information of the first system 201 to the network management system 205. The management information is management information that needs to be used when the network management system 205 manages the first system 201. The management information includes the identification information of the system and the alternative switching address of the system. The second correspondence is a correspondence between the identification information of the first system and the second management IP address of the first system. The second correspondence may be a direct correspondence or an indirect correspondence. After determining the second management IP address, the first system 201 sends the second correspondence between the identification information of the first system 201 and the second management IP address to the advertisement system 203. In some embodiments, the first system 201 and the advertisement system 203 are directly connected or are located in a layer 2 network. In this case, the first system 201 broadcasts information about the second correspondence to the advertisement system by using an Ethernet broadcast packet. In some embodiments, the first system 201 and the advertisement system 203 are not directly connected, and the first system 201 and the advertisement system 203 are located in a layer 3 network. The first system 201 sends the information about the second correspondence to the advertisement system 203 by using a data packet applicable to the layer 3 network. For example, the first system 201 may send the information about the second correspondence by using a layer 3 routing protocol-based flood packet.

S1115: The advertisement system records the second correspondence, and sends the second correspondence to the network management system.

In some embodiments, the advertisement system 203 receives the second correspondence sent by the first system 201, records the second correspondence, and sends the second correspondence to the network management system 205. The advertisement system 203 sends the second correspondence according to a network management protocol or through an API supported by the network management system 205.

S1117: The network management system obtains the second correspondence.

In some embodiments, the network management system 205 receives, according to the network management protocol or through the API, the second correspondence sent by the advertisement system 203. After receiving the second correspondence, the network management system 205 records the second correspondence. In some embodiments, the network management system 205 may record the second correspondence in a format described in Table 2, to generate a second correspondence table. According to the second correspondence table, the network management system 205 may manage the first system or the second system based on the identification information of the first system or identification information of the second system. For example, the network management system 205 may perform a configuration management operation on the first system 201 based on the first management IP address of the first system 201, and may switch a management IP address of the second system 202 based on the second management IP address of the second system 202. As described in Table 2, the network management system 205 has obtained the first correspondence and the second correspondence of the first system 201, and distinguishes between the first management IP address and the second management IP address based on types of management addresses. For example, if a management IP address is 128.9.191.240, an IP address type is IPv4, and a management address type is management, these indicate that 128.9.191.240 is an IPv4 management IP address, and is used by the network management system 205 to manage the first system 201 whose system identifier is 0x09BFF0. If a management IP address is FEC0::09:BFF0, an IP address type is IPv6, and a management address type is switching, these indicate that FEC0::09:BFF0 is an IPv6 alternative switching address, and is used to manage, when the network management system 205 needs to switch an IP address managed by a network management to an IPv6 address, the second system 202 whose system identifier is 0x09BFF0.

TABLE 2

| Identification information of the first/second system | Management IP address | IP address type | Management address type |
|---|---|---|---|
| 0x09BFF0 | 128.9.191.240 | IPv4 | Management |
| 0x09BFF0 | FEC0::09:BFF0 | IPv6 | Switching |
| 0x09BF10 | 128.9.191.16 | IPv4 | Management |
| 0x09BF10 | FEC0::09:BF10 | IPv6 | Switching |

Figure 12:
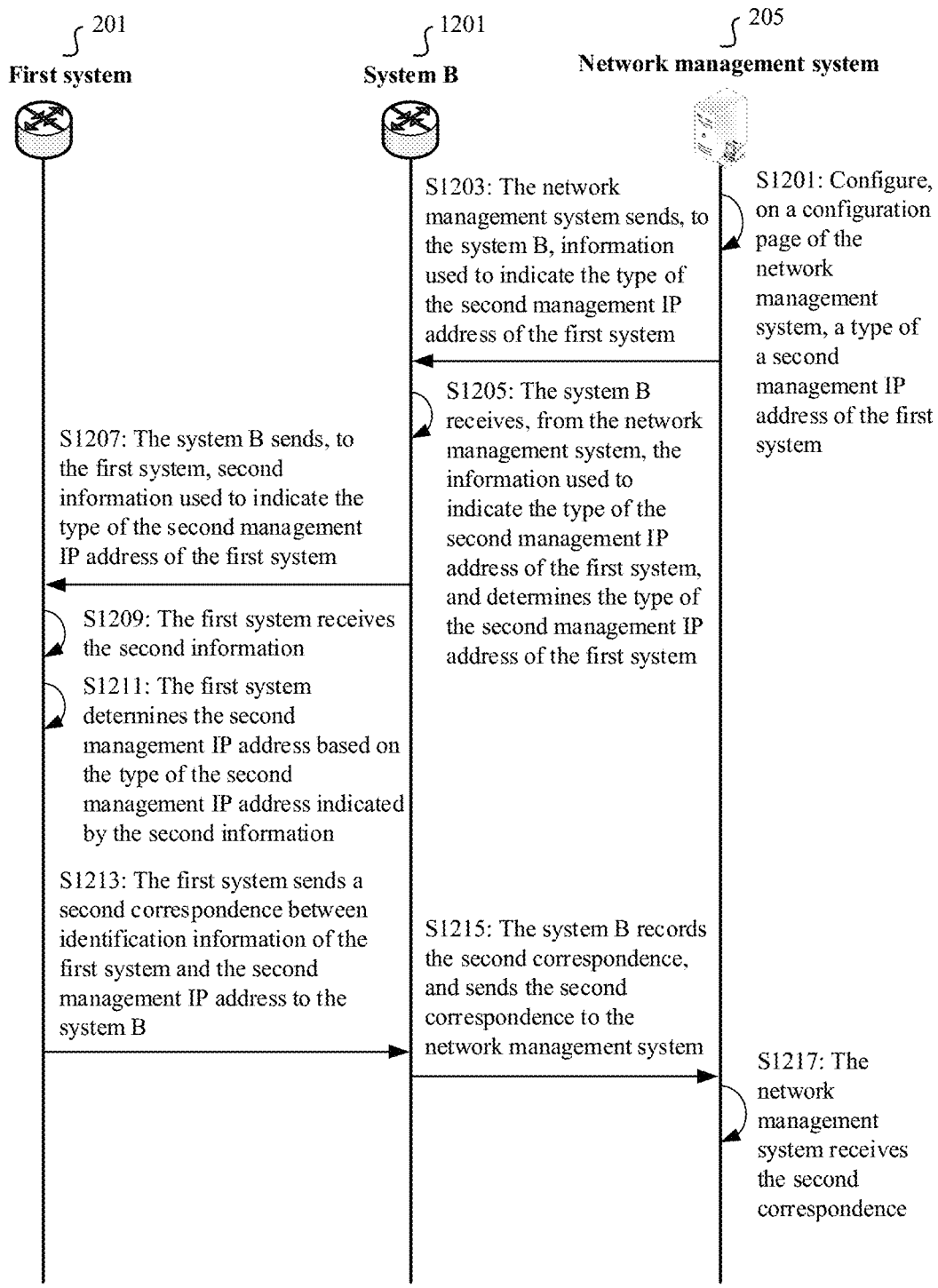
FIG. 12 is a flowchart of a method related to sending a management IP address according to an embodiment of this application.

In some embodiments, the second system 202 and the advertisement system 203 may be a same system B. The system B is a system with two system roles and functions, and has system roles and functions of the second system and the advertisement system. In this case, an embodiment of this application provides a method shown in FIG. 12.

S1201: Configure, on a configuration page of a network management system, a type of a second management IP address of a first system.

In some embodiments, the network management system 205 supports configuration of an alternative switching address. For example, a network administrator configures, on the configuration page of the network management system 205, an IP address type of the alternative switching address of the first system. The second management IP address is the alternative switching address of the first system. The network management system 205 obtains the type of the second management IP address by configuring the network management system 205.

S1203: The network management system sends, to the system B, information used to indicate the type of the second management IP address of the first system.

In some embodiments, the network management system 205 has configured the type of the second management IP address by performing the operation of S1201. The network management system 205 needs to send the information about the type of the second management IP address to the system B 1201. The network management system 205 sends, to the system B 1201, the information used to indicate the type of the second management IP address of the first system 201. In some embodiments, the network management system 205 sends, according to a network management protocol or through an API supported by the system B 1201, the information used to indicate the type of the second management IP address of the first system.

S1205: The system B receives the information used to indicate the type of the second management IP address of the first system, and determines the type of the second management IP address of the first system.

In some embodiments, the system B 1201 receives, from the network management system 205 according to the network management protocol or through the supported API, the information used to indicate the type of the second management IP address of the first system 201. After obtaining the information used to indicate the type of the second management IP address of the first system 201, the system B 1201 determines the type of the second management IP address of the first system 201.

S1207: The system B sends, to the first system, second information used to indicate the type of the second management IP address of the first system.

The second information is information that is used to indicate the type of the second management IP address of the first system 201 and that is sent by the system B to the first system 201. After determining the type of the second management IP address of the first system 201, the system B 1201 sends the second information to the first system 201.

In some embodiments, after receiving, from the network management system 205, the information used to indicate the type of the second management IP address of the first system 201, the system B determines the type of the second management IP address of the first system 201. The second information is information that is used to indicate the type of the second management IP address of the first system 201 and that is sent by the system B to the first system 201. The first system 201 needs to obtain the second information, and the first system 201 determines the alternative switching address of the first system 201 based on the second information. After determining the type of the second management IP address of the first system 201, the system B sends the second information to the first system 201, where the second information is used to indicate the type of the second management IP address of the first system 201. For a method for sending the second information by the system B to the first system 201, refer to the method for sending the first information by the system B to the first system 201.

In some embodiments, the system B receives a request packet for the type of the second management IP address of the first system 210, where the second information is information that is used to indicate the type of the second management IP address of the first system 201 and that is sent by the system B to the first system 201. After the first system 201 is powered on to be started, when a physical interface that is of the first system 201 and that is connected to the system B is in an enabled state, the first system 201 sends a request packet for the type of the second management IP address to the system B. A source MAC address of the request packet for the type of the second management IP address is a MAC address of the first system 201. The system B receives, from the first system 201, the request packet for the type of the second management IP address, and obtains the source MAC address of the packet. The system B encapsulates the second information into an Ethernet unicast packet. The packet is a response packet of the request packet for the type of the second management IP address of the first system 201. The system B sends the response packet to the first system 201. A destination MAC address of the response packet is the MAC address of the first system 201. The response packet carries the second information used to indicate type information of the second management IP address of the first system 201.

In some embodiments, after the first system 201 is powered on to be started and the physical interface is in the enabled state, the first system 201 initiates a PPPoE negotiation request to the system B. In some embodiments, the system B sends the second information to the first system 201 by executing a negotiation procedure in a PPPoE discovery phase. In some embodiments, the system B sends the second information to the first system 201 by executing a negotiation procedure in a PPPoE session phase.

S1209: The first system receives the second information.

In some embodiments, the first system 201 receives a packet including the second information, and extracts the second information from the packet. The second information indicates the type information of the second management IP address of the first system 201. The first system 201 obtains the type of the second management IP address.

S1211: The first system determines the second management IP address based on the type of the second management IP address indicated by the second information.

The first system 201 obtains the second information, and generates the second management IP address based on the type of the second management IP address indicated by the second information. In some embodiments, the first system 201 may generate an IPv4 management IP address and/or an IPv6 management IP address based on identification information of the first system 201.

S1213: The first system sends a second correspondence between the identification information of the first system and the second management IP address to the system B.

In some embodiments, after determining the second management IP address, the first system 201 needs to send the second correspondence between the identification information of the first system 201 and the second management IP address to the system B 1201.

S1215: The system B records the second correspondence, and sends the second correspondence to the network management system.

In some embodiments, the system B 1201 receives the second correspondence sent by the first system 201, records the second correspondence, and sends the second correspondence to the network management system 205. The system B 1201 may send the second correspondence according to a network management protocol or through an API supported by the network management system 205. In some embodiments, after receiving the second correspondence sent by the first system 201, the system B 1201 checks a type of the second management IP address in the second correspondence. For example, the system B 1201 compares the type of the second management IP address in the second correspondence with the type of the second management IP address determined by the system B 1201. If the type of the second management IP address in the second correspondence is the same as the type of the second management IP address determined by the system B 1201, it indicates that the first system 201 determines the second management IP address based on the type of the second management IP address indicated by the second information that is sent by the system B 1201. If the type of the second management IP address in the second correspondence is different from the type of the second management IP address determined by the system B 1201, it indicates that the first system 201 determines the second management IP address not based on the type of the second management IP address indicated by the second information that is sent by the system B 1201, and the first system 201 needs to re-determine the second management IP address.

S1217: The network management system obtains the second correspondence.

In some embodiments, the network management system 205 receives, according to the network management protocol or through the API, the second correspondence sent by the system B 1201, and records the second correspondence.

In some embodiments, the second system 202 and the advertisement system 203 are two different systems. According to the procedures shown in FIG. 3 and FIG. 11, the first correspondence and/or the second correspondence of the first system 201 are/is sent to the network management system 205 through the advertisement system 203. If the advertisement system 203 cannot send the first correspondence or the second correspondence, the network management system 205 cannot obtain the first correspondence or the second correspondence of the first system 201, and an online procedure or a management IP address switching procedure of the first system 201 is affected. In some embodiments, the network management system 205 supports a function of updating a system role. In this case, an embodiment of this application provides a method shown in FIG. 13A and FIG. 13B.

S1301 to S1307 implement the following operation procedures. The second system 202 determines a type of a first management IP address of the first system 201, the second system 202 sends, to the first system 201, first information used to indicate the type of the first management IP address, the first system 201 receives the first information, and the first system 201 determines the first management IP address based on the type of the first management IP address indicated by the first information. The operation procedures are the same as the operation procedures of S301 to S307, and details are not described herein again. S1301 to S1307 can also implement the following operation procedures. The second system 202 determines a type of a second management IP address of the first system 201, the second system 202 sends, to the first system 201, second information used to indicate the type of the second management IP address, the first system 201 receives the second information, and the first system 201 determines the second management IP address based on the type of the second management IP address indicated by the second information. Details are not described herein again.

S1309: The first system sends a first correspondence between identification information of the first system and the first management IP address to the second system and the advertisement system.

In this embodiment, the first system 201 not only sends the first correspondence to the advertisement system 203, but also needs to send the first correspondence to the second system 202. A purpose of this operation is to send data including the correspondence between the identification information of the first system 201 and the first management IP address to the two systems: the second system 202 and the advertisement system 203. If the advertisement system 203 fails to receive the first correspondence, the second system 202 can still receive the first correspondence. For a method that the first system 201 sends the first correspondence to the second system 202 and the advertisement system 203, refer to the operation of S309. Details are not described herein again.

The operation of S1309 can implement that the first system sends a second correspondence between the identification information of the first system and the second management IP address to the second system and the advertisement system.

S1311: The second system receives and records the first correspondence.

In some embodiments, the second system 202 receives and records the first correspondence that is sent by the first system 201. When the second system and the advertisement system are different systems, the first system also sends the first correspondence to the second system, and the second system receives and records the first correspondence. The second system may back up information about the first correspondence. When the advertisement system malfunctions and cannot send the first correspondence, the first correspondence received by the second system is used as backup information. In addition, the second system may check, based on the first correspondence, a type of a first management IP address generated by the first system. In some embodiments, after receiving the first correspondence sent by the first system 201, the second system 202 checks a type of the first management IP address in the first correspondence. For example, the second system 202 compares the type of the first management IP address in the first correspondence with the type of the first management IP address determined by the second system 202. If the type of the first management IP address in the first correspondence is the same as the type of the first management IP address determined by the second system 202, it indicates that the first system 201 determines the first management IP address based on the type of the first management IP address indicated by the first information that is sent by the second system 202. If the type of the first management IP address in the first correspondence is different from the type of the first management IP address determined by the second system 202, it indicates that the first system 201 determines the first management IP address not based on the type of the first management IP address indicated by the first information that is sent by the second system 202, and the first system 201 needs to re-determine the first management IP address.

In some embodiments, the operation of S1311 can implement that the second system 202 may receive and record the second correspondence. After receiving the second correspondence sent by the first system 201, the second system 202 checks a type of the second management IP in the second correspondence. Details are not described herein again.

S1313: The network management system discovers that the advertisement system malfunctions.

In some embodiments, the network management system 205 may monitor a working status of the advertisement system 203. The working status indicates a status of one or more functions of a system in a network. For example, the working status of the advertisement system 203 includes a packet receiving function is normal, a packet receiving function is abnormal, a packet sending function is normal, a packet sending function is abnormal, management is abnormal, and management is normal. For example, the network management system 205 may detect the working status of the advertisement system by periodically sending a detection packet to the advertisement system 203. In some embodiments, if the network management system 205 detects that the packet receiving function of the advertisement system 203 is abnormal, the network management system 205 detects that the working status of the advertisement system 203 is abnormal.

S1315: The network management system confirms that a system role of the second system needs to be updated.

In some embodiments, the network management system 205 supports a function of updating a system role. Updating a system role means that the network management system changes a system role of a system managed by the network management system to another system role or adds a system role, where adding a system role includes adding one or more system roles. For example, the network management system 205 updates the system role of the second system 202 to the second system and the advertisement system. The network management system 205 detects the working status of the advertisement system 203. If the network management system 205 discovers that the working status of the advertisement system 203 is abnormal, the advertisement system 203 cannot perform an operation that needs to be completed by the advertisement system. The network management system 205 needs to update the system role of the second system 202 to the roles of the second system and the advertisement system, so that the second system 202 also executes the operation of the advertisement system. For example, if the network management system 205 detects, by using a detection method, that the working status of the advertisement system 203 is abnormal, for example, if the working status is that management is abnormal, it indicates that the advertisement system 203 cannot be managed by the network management system 205. The network management system 205 determines that a system role of the advertisement system needs to be added to the system role of the second system 202, and updates the system role of the second system 202 to the second system and the advertisement system. In this case, the second system 202 supports to advertise management information of the first system 201 to the network management system 205, for example, the first correspondence or the second correspondence. In some embodiments, the network management system 205 may update a system role based on configuration performed by a network administrator. For example, the network administrator needs to adjust deployment of the advertisement system, and enable the second system to perform operations of the advertisement system, and the network administrator updates the system role by configuring the network management system.

S1317: The network management system sends system role update information to the second system.

In some embodiments, when the network management system 205 determines that the system role of the second system 202 needs to be updated to the second system and the advertisement system. The network management system 205 sends the system role update information to the second system 202. The role update information is used to notify that a system role of a system managed by the network management system needs to be updated and notify an updated system role. The network management system 205 may send the system role update information according to a network management protocol or an API supported by the second system 202.

S1319: The second system receives the system role update information sent by the network management system, and updates the system role.

In some embodiments, the second system 202 receives, according to the network management protocol or through the API, the system role update information sent by the network management system 205. For example, the second system 202 receives the system role update information sent by the network management system 205, and the role update information indicates that the second system 202 needs to update the system role to the second system and the advertisement system. The second system 202 updates the system role to the second system and the advertisement system.

S1321: The second system sends the first correspondence to the network management system.

In some embodiments, the second system 202 updates, as indicated by the system update information, the system role to the second system and the advertisement system. The second system 202 has a function of the advertisement system, and the second system 202 is the system A shown in FIG. 10. The second system 202 supports to send the first correspondence to the network management system 205.

Based on the operation of S1321, the second system may send the second correspondence to the network management system. Details are not described herein again.

S1323: The network management system receives and records the first correspondence.

In some embodiments, the network management system 205 receives, according to the network management protocol or through the API, the first correspondence sent by the second system 202. After receiving the first correspondence, the network management system 205 records the first correspondence.

In some embodiments, the network management system 205 may check whether a sending party of a data packet including the first correspondence is the advertisement system that is set by the network management system 205. This can avoid the following case. The network management system 205 receives a first correspondence sent by a system that is not the advertisement system, and the network management system 205 maintains a correspondence between incorrect system identification information and the first management IP address, causing a network management fault.

In some embodiments, if the network management system 205 has configured an alternative switching address, the first system 201 may determine the first management IP address and the second management IP address in an online process, and advertise the first correspondence and the second correspondence to the advertisement system in the online process. In this case, an embodiment of this application provides a method shown in FIG. 14.

S1401: The network management system configures a type of a second management IP address.

The second management IP address is an alternative switching address of the first system. In some embodiments, the network management system 205 supports configuration of the alternative switching address. For example, a network administrator configures, on a configuration page of the network management system 205, an IP address type of the alternative switching address of the first system. The network management system 205 obtains the type of the second management IP address by configuring the network management system 205.

S1403: The network management system sends information about the type of the second management IP address.

In some embodiments, the network management system 205 sends, to the second system 202, the information used to indicate the type of the second management IP address of the first system 201. The network management system 205 sends, according to a network management protocol or through an API supported by the second system 202, the information used to indicate the type of the second management IP address of the first system.

S1405: The second system determines a type of a first management IP address of the first system, receives, from the network management system, the information about the type of the second management IP address, and determines the type of the second management IP address of the first system.

In some embodiments, the second system 202 determines, based on a type of a management IP address of the second system, the type of the first management IP address of the first system 201. The second system 202 receives, from the network management system 205 according to the network management protocol or through the supported API, the information used to indicate the type of the second management IP address of the first system 201. After obtaining the information used to indicate the type of the second management IP address of the first system 201, the second system 202 determines the type of the second management IP address of the first system 201.

S1407: The second system sends first information and second information to the first system.

In some embodiments, after determining the type of the first management IP address and the type of the second management IP address of the first system 201, the second system 202 sends the first information and the second information to the first system 201. The first information is used to indicate the type of the first management IP address of the first system 201. The second information is used to indicate the type of the second management IP address of the first system 201. In some embodiments, the first information and the second information are encapsulated into a same data packet. In some embodiments, the first information and the second information may be encapsulated into different data packets.

In some embodiments, after receiving, from the network management system 205, the information used to indicate the type of the second management IP address of the first system 201, the second system 202 determines the type of the second management IP address of the first system 201. The second information is information that is used to indicate the type of the second management IP address of the first system 201 and that is sent by the second system 202 to the first system 201. After determining the type of the first management IP address and the type of the second management IP address of the first system 201, the second system 202 sends the first information and the second information to the first system 201. For a method for sending the first information and the second information by the second system 202 to the first system 201, refer to the method for sending the first information by the second system 202 to the first system 201.

In some embodiments, after the second system 202 receives a request packet for the type of the first management IP address and a request packet for the type of the second management IP address of the first system 210, the second system sends the first information and the second information to the first system 201. For example, after the first system 201 is powered on to be started, when a physical interface that is of the first system 201 and that is connected to the second system 202 is in an enabled state, the first system 201 sends a request packet for a type of a management IP address to the second system 202. The request packet for the type of the management IP address includes request information of the type of the first management IP address and request information of the type of the second management IP address. A source MAC address of the request packet for the type of the management IP address is a MAC address of the first system 201. The second system 202 receives, from the first system 201, the request packet for the type of the management IP address, and obtains the source MAC address of the packet. The second system 202 encapsulates the first information and the second information into an Ethernet unicast packet. The packet is a response packet of the request packet for the type of the management IP address of the first system 201. The second system 202 sends the response packet to the first system 201. A destination MAC address of the response packet is the MAC address of the first system 201. The response packet carries the first information used to indicate type information of the first management IP address of the first system 201 and the second information used to indicate the type information of the second management IP address of the first system 201.

In some embodiments, after the first system 201 is powered on to be started and the physical interface is in the enabled state, the first system 201 initiates a PPPoE negotiation request to the second system 202. In some embodiments, the second system 202 sends the first information and the second information to the first system 201 by executing a negotiation procedure in a PPPoE discovery phase. In some embodiments, the second system 202 sends the first information and the second information to the first system 201 by executing a negotiation procedure in a PPPoE session phase.

S1409: The first system receives the first information and the second information.

In some embodiments, a packet received by the first system 201 includes both the first information and the second information. In some embodiments, the first system 201 separately receives a packet including the first information, and a packet including the second information. The first system 201 extracts the first information and the second information from the packets. The first information indicates the type information of the first management IP address of the first system 201. The second information indicates the type information of the second management IP address of the first system 201.

S1411: The first system determines the first management IP address based on the type of the first management IP address indicated by the first information, and determines the second management IP address based on the type of the second management IP address indicated by the second information.

The first system 201 obtains the first information and the second information, determines the first management IP address based on the type of the first management IP address indicated by the first information, and determines the second management IP address based on the type of the second management IP address indicated by the second information.

S1413: The first system sends a first correspondence and a second correspondence.

In some embodiments, after the first system 201 determines the first management IP address and the second management IP address, the first system 201 needs to send, to the advertisement system 203, the first correspondence between identification information of the first system 201 and the first management IP address and the second correspondence between the identification information of the first system 201 and the second management IP address. In some embodiments, the first correspondence and the second correspondence are encapsulated into a same data packet, and are sent by the first system 201 to the advertisement system. For example, the first correspondence and the second correspondence are encapsulated into an extended TLV field of an IS-IS LSP packet. In some embodiments, the first correspondence and the second correspondence are encapsulated into different data packets, and are separately sent by the first system 201 to the advertisement system.

S1415: The advertisement system records the first correspondence and the second correspondence, and sends the first correspondence and the second correspondence to the network management system.

In some embodiments, the advertisement system 203 receives the first correspondence and the second correspondence sent by the first system 201, records the first correspondence and the second correspondence, and sends the first correspondence and the second correspondence to the network management system 205. In some embodiments, the advertisement system 203 sends the first correspondence and the second correspondence together according to a network management protocol or through an API supported by the network management system 205. In some embodiments, the advertisement system 203 sends the first correspondence and the second correspondence separately according to a network management protocol or through an API supported by the network management system 205.

S1417: The network management system receives the first correspondence and the second correspondence.

In some embodiments, the network management system 205 receives, according to the network management protocol or through the API, the first correspondence and the second correspondence sent by the advertisement system 203, and records the first correspondence and the second correspondence.

In some embodiments, the second system 202 and the advertisement system 203 may be a same system C. The system C is a system with two system roles and functions, and has system roles and functions of the second system and the advertisement system. In this case, an embodiment of this application provides a method shown in FIG. 15.

S1501: The network management system configures a type of a second management IP address.

The second management IP address is an alternative switching address of the first system. In some embodiments, the network management system 205 supports configuration of the alternative switching address. For example, a network administrator configures, on a configuration page of the network management system 205, an IP address type of the alternative switching address of the first system. The network management system 205 obtains the type of the second management IP address by configuring the network management system 205.

S1503: The network management system sends information about the type of the second management IP address.

In some embodiments, the network management system 205 sends, to the system C 1501, the information used to indicate the type of the second management IP address of the first system 201. The network management system 205 sends, according to a network management protocol or through an API supported by the system C 1501, the information used to indicate the type of the second management IP address of the first system.

S1505: The system C determines a type of a first management IP address of the first system, receives, from the network management system, the information about the type of the second management IP address, and determines the type of the second management IP address of the first system.

In some embodiments, the system C 1501 determines, based on a type of a management IP address of the system C 1501, the type of the first management IP address of the first system 201. The system C 1501 receives, from the network management system 205 according to the network management protocol or through the supported API, the information used to indicate the type of the second management IP address of the first system 201. After obtaining the information used to indicate the type of the second management IP address of the first system 201, the system C 1501 determines the type of the second management IP address of the first system 201.

S1507: The system C sends first information and second information to the first system.

In some embodiments, after determining the type of the first management IP and the type of the second management IP address of the first system 201, the system C 1501 sends the first information and the second information to the first system 201. The first information is used to indicate the type of the first management IP address of the first system 201. The second information is used to indicate the type of the second management IP address of the first system 201. In some embodiments, the first information and the second information are encapsulated into a same data packet. In some embodiments, the first information and the second information may be encapsulated into different data packets.

S1509: The first system receives the first information and the second information.

In some embodiments, a packet received by the first system 201 includes both the first information and the second information. In some embodiments, the first system 201 separately receives a packet including the first information, and a packet including the second information. The first system 201 extracts the first information and the second information from the packet. The first information is information indicating the type of the first management IP address of the first system 201. The second information is information indicating the type of the second management IP address of the first system 201.

S1511: The first system determines the first management IP address based on the type of the first management IP address indicated by the first information, and determines the second management IP address based on the type of the second management IP address indicated by the second information.

The first system 201 obtains the first information and the second information, determines the first management IP address based on the type of the first management IP address indicated by the first information, and determines the second management IP address based on the type of the second management IP address indicated by the second information.

S1513: The first system sends a first correspondence and a second correspondence.

In some embodiments, after the first system 201 determines the first management IP address and the second management IP address, the first system 201 needs to send, to the system C 1501, the first correspondence between identification information of the first system 201 and the first management IP address and the second correspondence between the identification information of the first system 201 and the second management IP address. In some embodiments, the first correspondence and the second correspondence are encapsulated into a same data packet, and are sent by the first system 201 to the system C 1501. For example, the first correspondence and the second correspondence are encapsulated into an extended TLV field of an IS-IS LSP packet. In some embodiments, the first correspondence and the second correspondence are encapsulated into different data packets, and are separately sent by the first system 201 to the system C 1501.

S1515: The system C records the first correspondence and the second correspondence, and sends the first correspondence and the second correspondence to the network management system.

In some embodiments, the system C 1501 receives the first correspondence and the second correspondence sent by the first system 201, records the first correspondence and the second correspondence, and sends the first correspondence and the second correspondence to the network management system 205. In some embodiments, the system C 1501 sends the first correspondence and the second correspondence together according to a network management protocol or through an API supported by the network management system 205. In some embodiments, the system C 1501 separately sends the first correspondence and the second correspondence according to a network management protocol or an API supported by the network management system 205.

S1517: The network management system receives the first correspondence and the second correspondence.

In some embodiments, the network management system 205 receives, according to the network management protocol or through the API, the first correspondence and the second correspondence sent by the system C 1501, and records the first correspondence and the second correspondence.

The embodiments of this application further provide a first system. The first system is configured to perform, by using modules shown in FIG. 16, a part of or all of the operations performed by the first system in FIG. 3 or FIG. 10 to FIG. 15. Refer to FIG. 16. The first system 1600 includes the following modules.

A first information receiving module 1601 is configured to receive, from a second system, first information used to indicate a type of a first management IP address of the system. For the operation performed by the first information receiving module 1601, refer to S305 shown in FIG. 3, S1005 shown in FIG. 10, S1305 shown in FIG. 13A, S1409 shown in FIG. 14, and S1509 shown in FIG. 15. The first information receiving module 1601 is further configured to receive a response packet of a request packet for a type of a management IP address, where the response packet includes the first information. For the operation performed by the first information receiving module 1601, refer to S303 shown in FIG. 3.

A first management IP address determining module 1602 is configured to determine the first management IP address for the system based on the type of the first management IP address indicated by the first information. For the operation performed by the first management IP address determining module 1602, refer to S307 shown in FIG. 3, S1007 shown in FIG. 10, S1307 shown in FIG. 13A, S1411 shown in FIG. 14, and S1511 shown in FIG. 15.

A first correspondence releasing module 1603 is configured to send a first correspondence between identification information of the first system and the first management IP address to an advertisement system and/or the second system. For the operation performed by the first correspondence releasing module 1603, refer to S309 shown in FIG. 3, S1009 shown in FIG. 10, S1309 shown in FIG. 13A, S1413 shown in FIG. 14, and S1513 shown in FIG. 15. The first system receives the first information from the second system by using the first information receiving module 1601. The first system determines, by using the first management IP address determining module 1602, the first management IP address of the first system based on the type of the first management IP address indicated by the first information.

According to this method, the first system can automatically select a type of a management IP address, so that a network administrator does not need to manually log in to the first system to configure management IP addresses and types of the management IP addresses. This improves efficiency of configuring the management IP addresses.

In some embodiments, the first system 1600 may further include the following modules.

A second information receiving module 1604 is configured to receive, from the second system, second information used to indicate a type of a second management IP address of the first system, where the second management IP address is an alternative switching address of the first management IP address. For the operation performed by the second information receiving module 1604, refer to S1109 shown in FIG. 11, S1209 shown in FIG. 12, S1409 shown in FIG. 14, and S1509 shown in FIG. 15.

A second management IP address determining module 1605 is configured to determine the second management IP address for the first system based on the type of the second management IP address indicated by the second information. For the operation performed by the second management IP address determining module 1605, refer to S1111 shown in FIG. 11, S1211 shown in FIG. 12, S1411 shown in FIG. 14, and S1511 shown in FIG. 15.

A second correspondence releasing module 1606 is configured to send a second correspondence between the identification information of the first system and the second management IP address to the advertisement system. For the operation performed by the second correspondence releasing module 1606, refer to S1113 in FIG. 11, S1213 shown in FIG. 12, S1413 shown in FIG. 14, and S1513 shown in FIG. 15. According to this method, a network management system may obtain the second management IP address of the system when the system is being online or after the system is online, and is configured to switch and back up a management IP address. This method improves efficiency of switching the management IP address by the network management system, and improves reliability of the network management system.

A management IP address type request sending module 1607 is configured to send a request packet for the type of the first management IP address and/or a request packet for the type of the second management IP address of the first system. For the operation performed by the management IP address type request sending module 1607, refer to S303 shown in FIG. 3, S1003 shown in FIG. 10, S1303 shown in FIG. 13B, S1407 shown in FIG. 14, and S1507 shown in FIG. 15.

In some embodiments, modules in the first system 1600 may be deployed in a same physical device. In other embodiments, modules in the first system 1600 may be deployed in a plurality of different physical devices. Each of the modules in the first system 1600 may be a hardware module or a module of combination of software and hardware.

Figure 17:
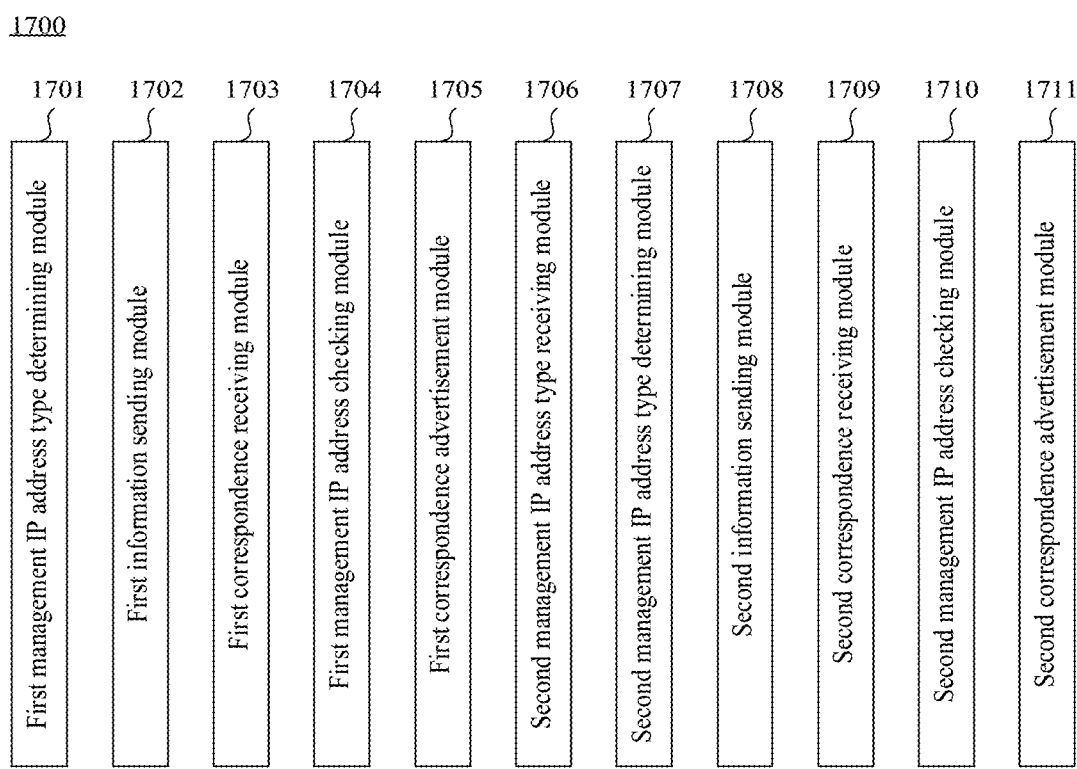
FIG. 17 is a schematic diagram of a second system according to an embodiment of this application.

The embodiments of this application further provide a second system. The second system is configured to perform, by using modules shown in FIG. 17, a part of or all of the operations performed by the second system or the system A to the system C in FIG. 3 or FIG. 10 to FIG. 15. Refer to FIG. 17. The second system 1700 includes the following modules.

A first management IP address type determining module 1701 is configured to determine a type of a first management IP address of a first system. For the operation performed by the first management IP address type determining module

Figure 13A:
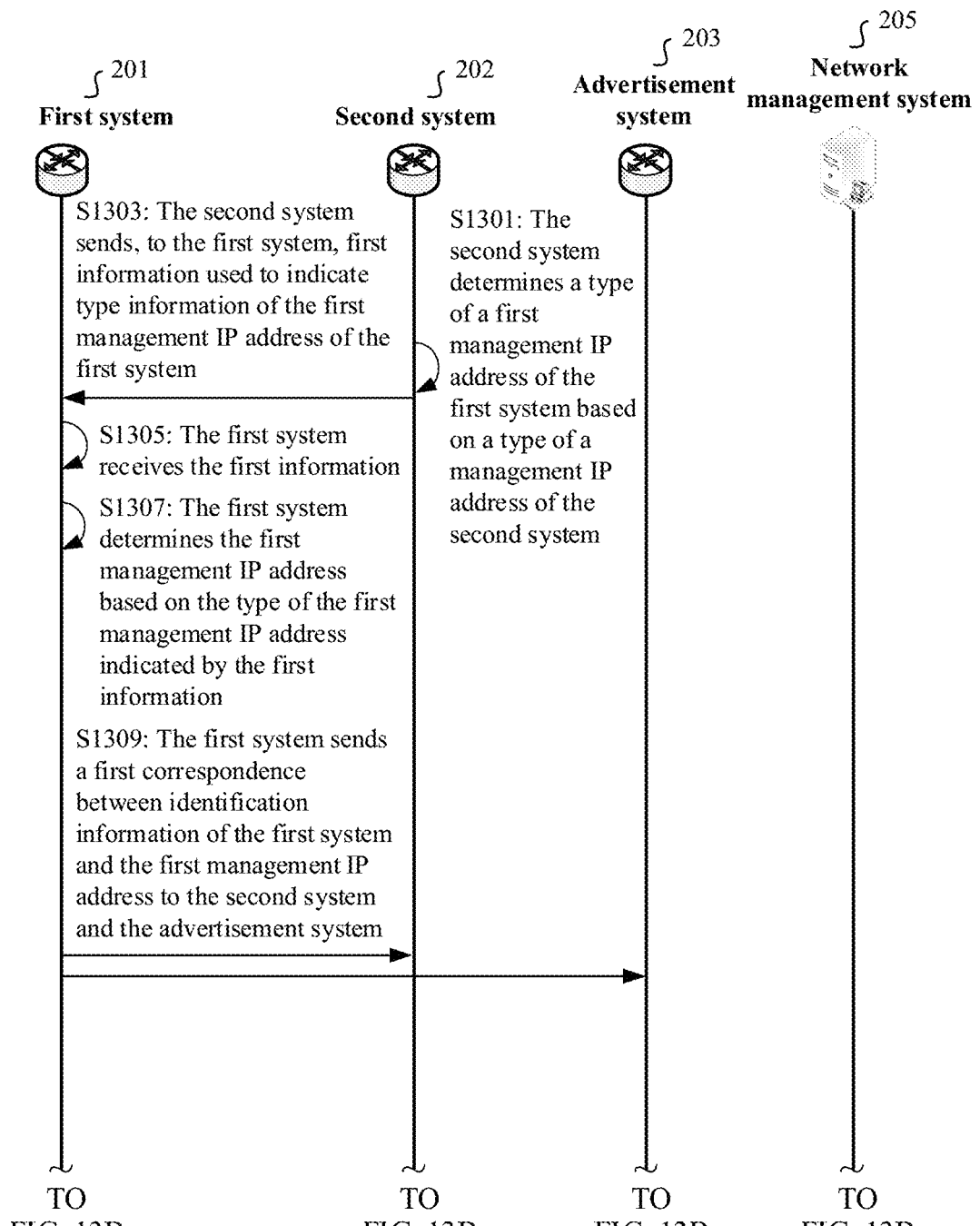
FIG. 13A and FIG. 13B are a flowchart of a method related to sending a management IP address according to an embodiment of this application.
Figure 13B:
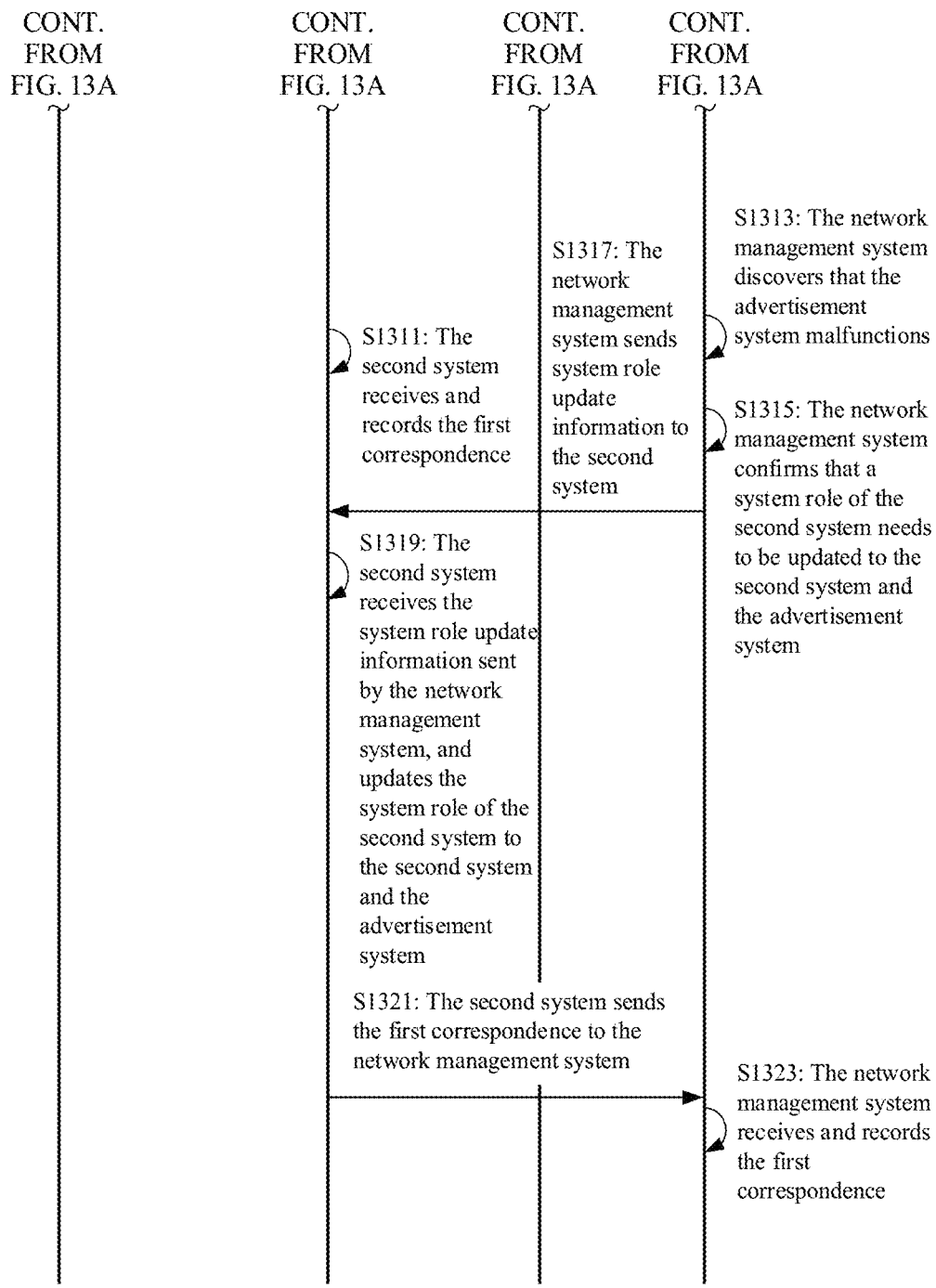
Figure 14:
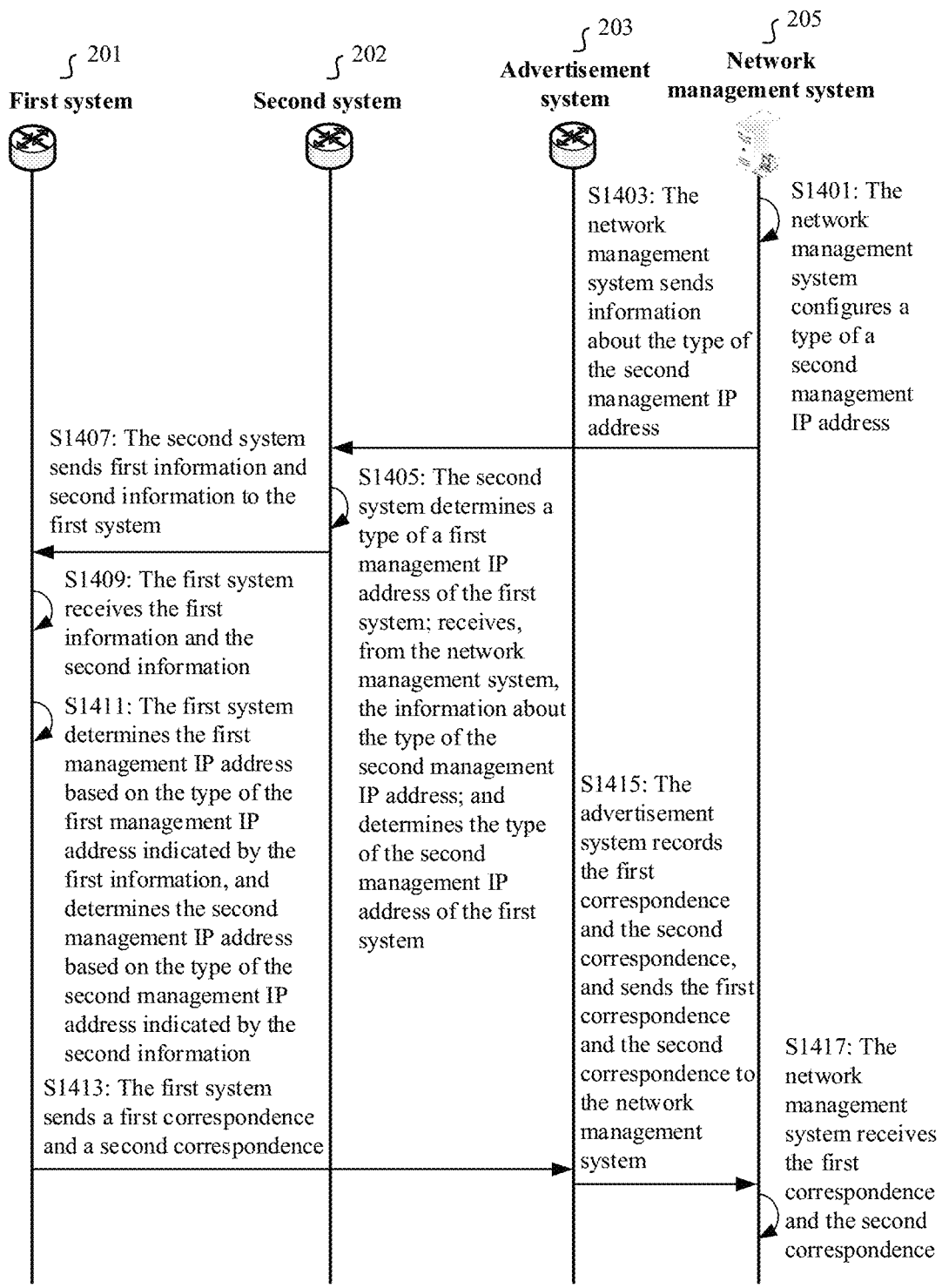
FIG. 14 is a flowchart of a method related to sending a management IP address according to an embodiment of this application.
Figure 15:
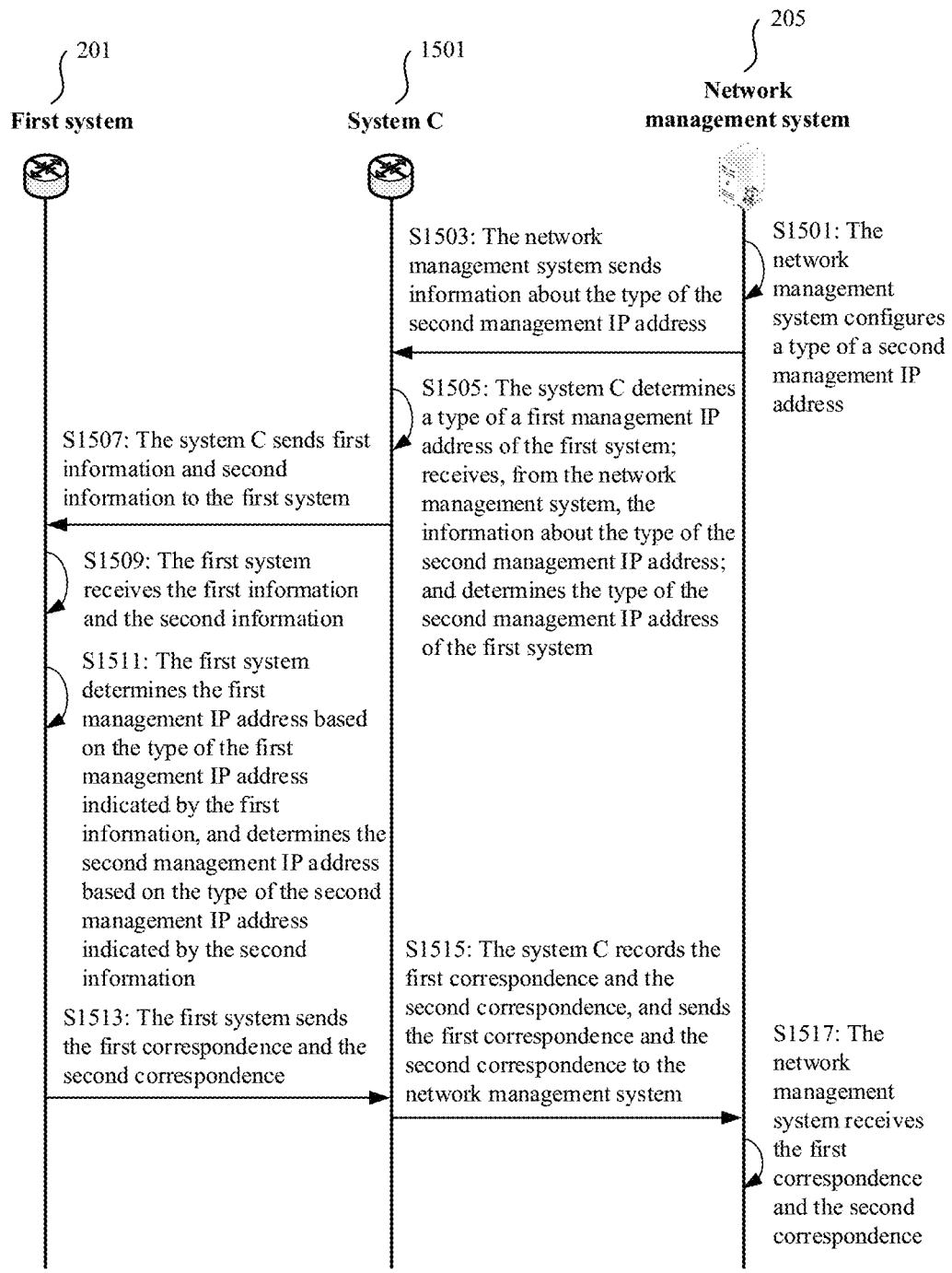
FIG. 15 is a flowchart of a method related to sending a management IP address according to an embodiment of this application.
Figure 16:
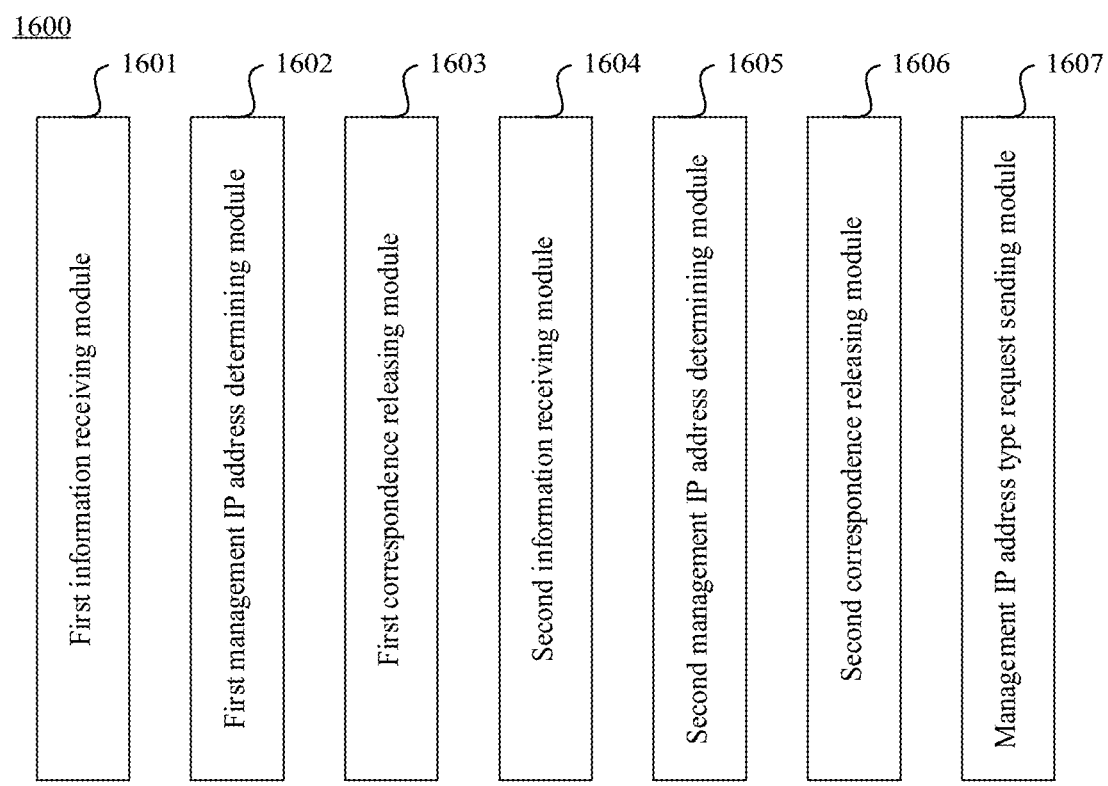
FIG. 16 is a schematic diagram of a first system according to an embodiment of this application.

1701, refer to S301 shown in FIG. 3, S1001 shown in FIG. 10, S1301 shown in FIG. 13A, S1405 shown in FIG. 14, and S1505 shown in FIG. 15. According to this method, the first system can automatically select a type of a management IP address, so that a network administrator does not need to manually log in to the first system to manage types of management IP addresses and configurations of the management IP addresses. This improves efficiency of configuring the management IP addresses.

A first information sending module 1702 is configured to send first information to the first system, where the first information is used to indicate the type of the first management IP address. For the operation performed by the first information sending module 1702, refer to S303 shown in FIG. 3, S1003 shown in FIG. 10, S1303 shown in FIG. 13B, S1407 shown in FIG. 14, and S1507 shown in FIG. 15.

In some embodiments, the second system 1700 may further include the following modules.

A first correspondence receiving module 1703 is configured to receive, from the first system, a first correspondence between identification information of the first system and the first management IP address of the first system. For the operation performed by the first correspondence receiving module 1703, refer to S1011 shown in FIG. 10, S1311 shown in FIG. 13B, and S1515 shown in FIG. 15. The second system receives and records the first correspondence by using the first correspondence receiving module 1703. When an advertisement system malfunctions, the second system may take the place of the advertisement system to receive the first correspondence. This method improves reliability of the network management system.

A first management IP address checking module 1704 is configured to check whether a type of the first management IP address complies with the type indicated by the first information. For the operation performed by the first management IP address checking module 1704, refer to S1011 shown in FIG. 10, S1311 shown in FIG. 13B, and S1515 shown in FIG. 15. The second system checks the first management IP address in the first correspondence by using the first management IP address checking module 1704. This can improve reliability and availability of the network management system.

A first correspondence advertisement module 1705 is configured to send the first correspondence to a network management system. For the operation performed by the first correspondence advertisement module 1705, refer to S1011 shown in FIG. 10, S1321 shown in FIG. 13B, and S1515 shown in FIG. 15. The second system sends the first correspondence to the network management system by using the first correspondence advertisement module 1705. When the advertisement system malfunctions, the second system sends the first correspondence to the network management system. This method improves reliability of the network management system.

A second management IP address type receiving module 1706 is configured to receive, from the network management system, information used to indicate a type of a second management IP address of the first system. For the operation performed by the second management IP address type receiving module 1706, refer to S1105 shown in FIG. 11, S1205 shown in FIG. 12, S1405 shown in FIG. 14, and S1505 shown in FIG. 15.

A second management IP address type determining module 1707 is configured to determine the type of the second management IP address of the first system based on the information used to indicate the type of the second management IP address. For the operation performed by the second management IP address type determining module 1707, refer to S1105 shown in FIG. 11, S1205 shown in FIG. 12, S1405 shown in FIG. 14, and S1505 shown in FIG. 15.

A second information sending module 1708 is configured to send second information to the first system, where the second information used to indicate the type of the second management IP address of the first system. For the operation performed by the second information sending module 1708, refer to S1107 shown in FIG. 11, S1207 shown in FIG. 12, S1407 shown in FIG. 14, and S1507 shown in FIG. 15.

A second correspondence receiving module 1709 is configured to receive, from the first system, a second correspondence between identification information of the first system and the second management IP address of the first system. For the operation performed by the second correspondence receiving module 1709, refer to S1215 shown in FIG. 12 and S1515 shown in FIG. 15.

A second management IP address checking module 1710 is configured to check whether a type of a second management IP address received from the first system complies with the type indicated by the second information. For the operation performed by the second management IP address checking module 1710, refer to S1215 shown in FIG. 12 and S1515 shown in FIG. 15. The second system checks the second management IP address in the second correspondence by using the second management IP address checking module 1710. This can improve reliability and availability of the network management system.

A second correspondence advertisement module 1711 is configured to send the second correspondence to the network management system. For the operation performed by the second correspondence advertisement module 1711, refer to S1215 shown in FIG. 12 and S1215 shown in FIG. 15. According to this method, the network management system may obtain the second management IP address of the system when the system is being online or after the system is online, and is configured to switch and back up a management IP address. This method improves efficiency of switching the management IP address by the network management system, and improves reliability of the network management system.

A system role update information processing module 1712 is configured to receive system role update information from the network management system, and update a system role of the second system based on the system role update information. For the operation performed by the system role update information processing module 1712, refer to S1319 shown in FIG. 13B.

In some embodiments, modules in the second system 1700 may be deployed in a same physical device. In other embodiments, modules in the second system 1700 may be deployed in a plurality of different physical devices. Each of the modules in the second system 1700 may be a hardware module or a module of combination of software and hardware.

Figure 18:
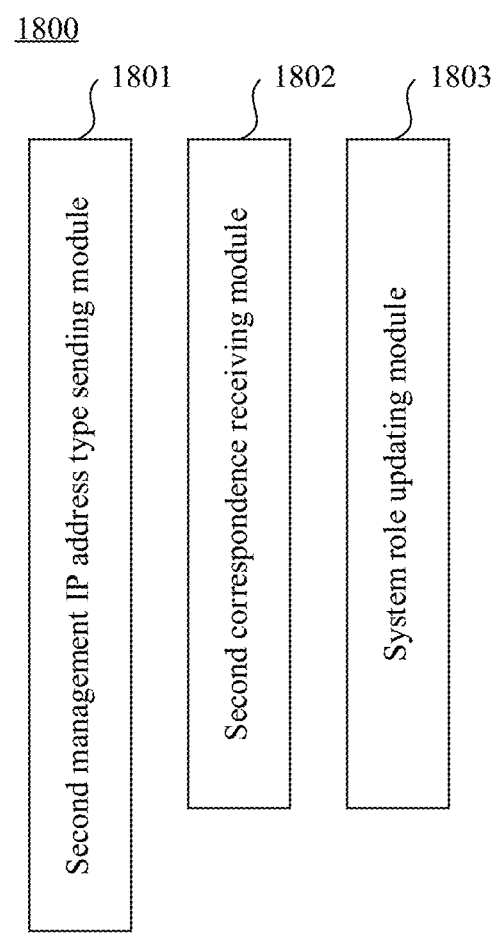
FIG. 18 is a schematic diagram of a network management system according to an embodiment of this application.

The embodiments of this application further provide a network management system. The network management system is configured to perform, by using modules shown in FIG. 18, a part of or all of the operations performed by the network management system in FIG. 11 or FIG. 13A and FIG. 13B. Refer to FIG. 18. The network management system 1800 includes the following modules.

A second management IP address type sending module 1801 is configured to send, to a second system, information used to indicate a type of a second management IP address of a first system, where the second management IP address is an alternative switching address of the first system. For the operation performed by the second management IP address type sending module 1801, refer to S1103 shown in FIG. 11, S1203 shown in FIG. 12, S1403 shown in FIG. 14, and S1503 shown in FIG. 15.

A second correspondence receiving module 1802 is configured to receive, from an advertisement system, a second correspondence between identification information of the first system and the second management IP address of the system. For the operation performed by the second correspondence receiving module 1802, refer to S1117 in FIG. 11, S1217 shown in FIG. 12, S1417 shown in FIG. 14, and S1517 shown in FIG. 15. According to this method, the network management system may obtain the second management IP address of the system when the system is being online or after the system is online, and is configured to switch and back up a management IP address. This method improves efficiency of switching the management IP address by the network management system, and improves reliability of the network management system.

In some embodiments, the network management system 1800 may further include the following modules.

A system role updating module 1803 is configured to send system role update information to the second system, where the system role update information is used to indicate the second system to update a role. For the operation performed by the system role updating module 1803, refer to S1317 shown in FIG. 13B. According to this method, when the advertisement system malfunctions, after the role of the second system is updated to the second system and the advertisement system, the second system may send management information of the first system to the network management system, and the network management system can continue to operate properly. This improves network reliability.

In some embodiments, modules in the network management system 1800 may be deployed in a same physical device. In other embodiments, modules in the network management system 1800 may be deployed in a plurality of different physical devices. Each of the modules in the network management system 1800 may be a hardware module or a module of combination of software and hardware.

It should be understood that, when the systems provided in FIG. 16, FIG. 17, and FIG. 18 implement functions of the systems, division into the foregoing functional modules is merely used as an example for description. During actual application, the foregoing functions may be allocated to different functional modules for implementation as required. In other words, an inner structure of a system is divided into different functional modules, to implement all or a part of the functions described above. In addition, the systems in the foregoing embodiments and the method embodiments are based on a same concept. For a specific implementation process, refer to the method embodiments. Details are not described herein again.

Figure 19:
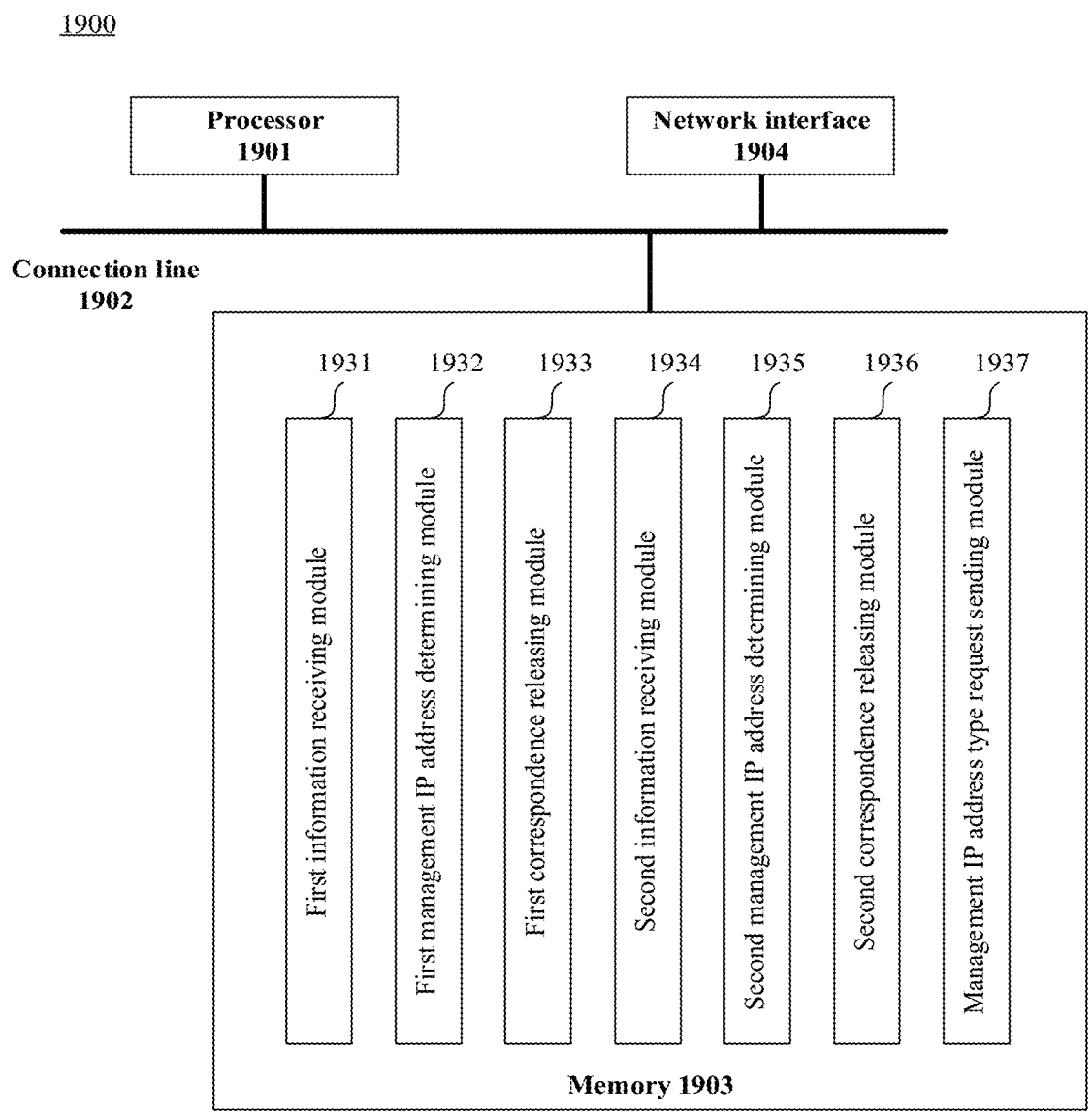
FIG. 19 is a schematic diagram of a first system according to an embodiment of this application.

FIG. 19 is a schematic diagram depicting a structure of a first system 1900 according to an embodiment of this application. The first system 1900 shown in FIG. 19 is configured to perform operations related to the management IP address advertisement method shown in FIG. 3 and FIG. 10 to FIG. 15. As shown in FIG. 19, the first system 1900 includes at least one processor 1901, a connection line 1902, a memory 1903, and at least one network interface 1904.

The processor 1901 is, for example, a general-purpose central processing unit (CPU), a digital signal processor (DSP), a network processor (NP), a graphics processing unit (GPU), a neural-network processing unit (NPU), a data processing unit (DPU), a microprocessor, or one or more integrated circuits configured to implement the solutions of this application. For example, the processor 1901 includes an application-specific integrated circuit (ASIC), a programmable logic device (PLD) or another PLD, a transistor logic device, a hardware component, or any combination thereof. The PLD may be a complex PLD (CPLD), a field-programmable gate array (FPGA), a generic array logic (GAL), or any combination thereof. The processor 1901 may implement or execute various logical blocks, modules, and circuits described with reference to content disclosed in the embodiments of the present disclosure. The processor may be a combination of processors implementing a computing function, for example, a combination including one or more microprocessors, or a combination of a DSP and a microprocessor.

The first system 1900 may further include the connection line 1902. The connection line 1902 is configured to transfer information between the components of the first system 1900. The connection line may be a Peripheral Component Interconnect (PCI) bus, an Extended Industry Standard Architecture (EISA) bus, or the like. The bus may be classified as an address bus, a data bus, a control bus, and the like. For ease of representation, only one thick line is used to represent the bus in FIG. 19, but this does not mean that there is only one bus or only one type of bus.

The memory 1903 may be, for example, a read-only memory (ROM) or another type of static storage device capable of storing static information and instructions, or a random-access memory (RAM) or another type of dynamic storage device capable of storing information and instructions, or may be an electrically erasable programmable ROM (EEPROM), a compact disc (CD) ROM (CD-ROM) or another CD storage, another optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or data structures and capable of being accessed by a computer. The memory 1903 is not limited thereto. The memory 1903 may exist independently, and is connected to the processor 1901 through the connection line. The memory 1903 may be integrated with the processor 1901.

The network interface 1904 is configured to communicate with another device or a communications network by using any apparatus of a transceiver type, where the communications network may be the Ethernet, a radio access network (RAN), or a wireless local area network (WLAN). The network interface 1904 may include a wired communications interface, and may further include a wireless communications interface. Further, the network interface 1904 may be an Ethernet interface, a Fast Ethernet (FE) interface, a Gigabit Ethernet (GE) interface, an Asynchronous Transfer Mode (ATM) interface, a WLAN interface, a cellular network communications interface, or a combination thereof. The Ethernet interface may be an optical interface, an electrical interface, or a combination thereof. In this embodiment of this application, the network interface 1904 may be used by the first system 1900 to communicate with another device.

During specific implementation, in an embodiment, the processor 1901 may include one or more CPUs. Each of the processors may be a single-core processor or a multi-core processor. The processor herein may be one or more devices, circuits, and/or processing cores for processing data (for example, computer program instructions).

During specific implementation, in an embodiment, the first system 1900 may include a plurality of processors. Each of the processors may be a single-core processor or a multi-core processor. The processor herein may be one or more devices, circuits, and/or processing cores for processing data (for example, computer program instructions).

During specific implementation, in an embodiment, the first system 1900 may further include an output device and an input device. The output device communicates with the processor 1901, and may display information in a plurality of manners. For example, the output device may be a liquid-crystal display (LCD), a light-emitting diode (LED) display device, a cathode-ray tube (CRT) display device, or a projector. The input device communicates with the processor 1901, and may receive a user input in a plurality of manners. For example, the input device may be a mouse, a keyboard, a touchscreen device, or a sensor device.

In some embodiments, the memory 1903 is configured to store program modules and data. The program modules include a first information receiving module 1931, a first management IP address determining module 1932, a first correspondence releasing module 1933, a second information receiving module 1934, a second management IP address determining module 1935, a second correspondence releasing module 1936, and a management IP address type request sending module 1937. In some embodiments, the modules in the memory 1903 in FIG. 19 respectively correspond to the modules shown in FIG. 16. The processor 1901 can perform, by executing computer-readable instructions in the modules in the memory 1903, operations that can be performed by the modules shown in FIG. 16.

In a specific embodiment, the first system 1900 in this embodiment of this application may correspond to the plurality of the foregoing embodiments. For example, the first system 1900 corresponds to the first system in the plurality of embodiments corresponding to FIG. 3 to FIG. 15. The processor 1901 in the first system 1900 reads instructions from the memory 1903, so that the first system 1900 shown in FIG. 19 can perform all or a part of the operations performed by the first system in the plurality of the foregoing embodiments.

Figure 20:
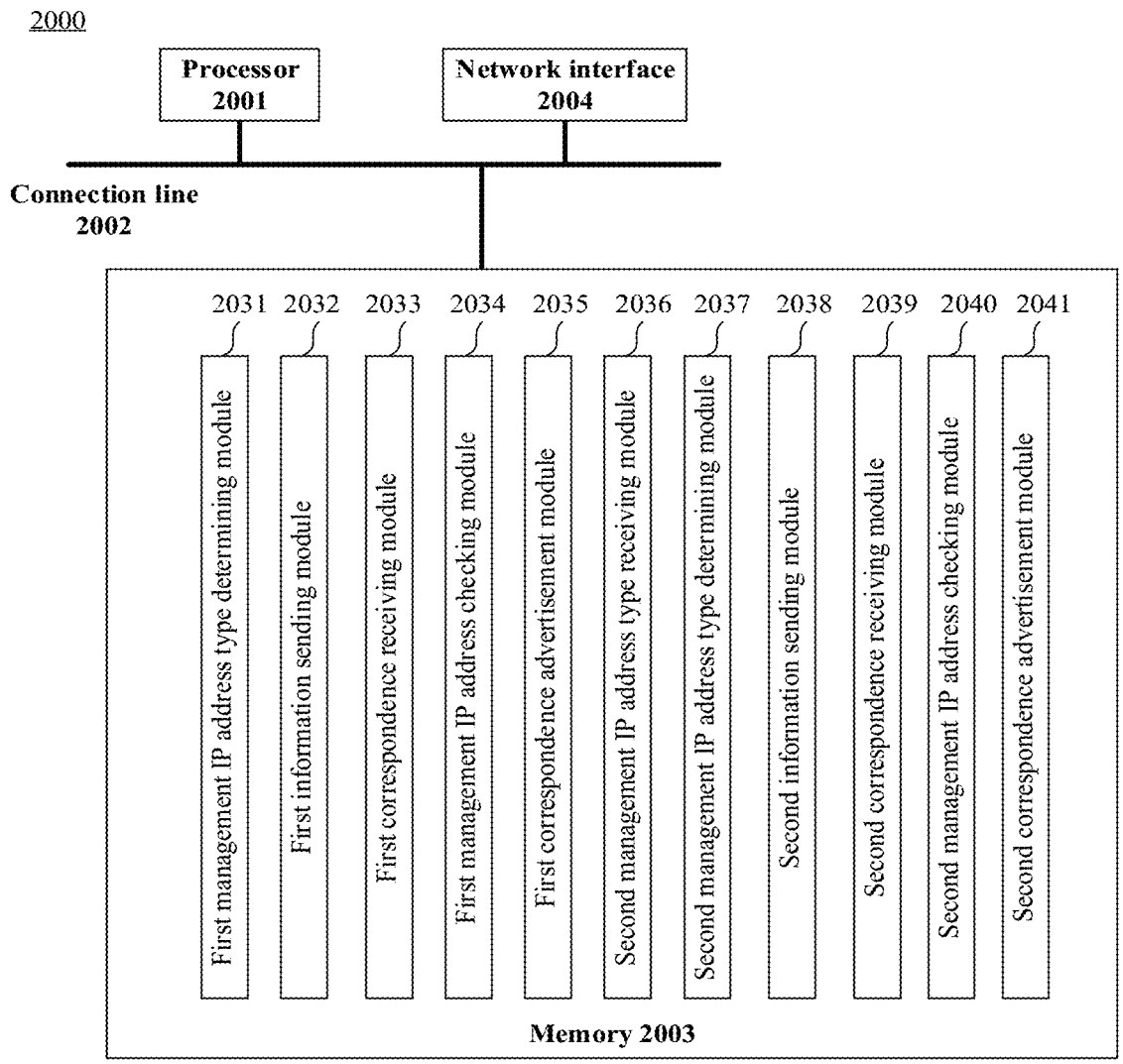
FIG. 20 is a schematic diagram of a second system according to an embodiment of this application.

FIG. 20 is a schematic diagram depicting a structure of a second system 2000 according to an embodiment of this application. The second system 2000 shown in FIG. 20 is configured to perform operations related to the management IP address advertisement method shown in FIG. 3 and FIG. 10 to FIG. 15. As shown in FIG. 20, the second system 2000 includes at least one processor 2001, a connection line 2002, a memory 2003, and at least one network interface 2004.

The processor 2001 is, for example, a general-purpose CPU, a DSP, an NP, a GPU, an NPU, a DPU, a microprocessor, or one or more integrated circuits configured to implement the solutions of this application. For example, the processor 2001 includes an ASIC, a PLD or another PLD, a transistor logic device, a hardware component, or any combination thereof. The PLD may be a CPLD, an FPGA, a GAL, or any combination thereof. The processor 2001 may implement or execute various logical blocks, modules, and circuits described with reference to content disclosed in the embodiments of the present disclosure. The processor may be a combination of processors implementing a computing function, for example, a combination including one or more microprocessors, or a combination of a DSP and a microprocessor.

The second system 2000 may further include the connection line 2002. The connection line 2002 is configured to transfer information between the components of the second system 2000. The connection line may be a PCI bus, an EISA bus, or the like. The bus may be classified as an address bus, a data bus, a control bus, and the like. For ease of representation, only one thick line is used to represent the bus in FIG. 20, but this does not mean that there is only one bus or only one type of bus.

The memory 2003 may be, for example, a ROM or another type of static storage device capable of storing static information and instructions, or a RAM or another type of dynamic storage device capable of storing information and instructions, or may be an EEPROM, a CD-ROM or another CD storage, another optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or data structures and capable of being accessed by a computer. The memory 2003 is not limited thereto. The memory 2003 may exist independently, and is connected to the processor 2001 through the connection line. The memory 2003 may be integrated with the processor 2001.

The network interface 2004 is configured to communicate with another device or a communications network by using any apparatus of a transceiver type, where the communications network may be the Ethernet, a radio access network, or a wireless local area network. The network interface 2004 may include a wired communications interface, and may further include a wireless communications interface. Further, the network interface 2004 may be an Ethernet interface, an FE interface, a GE interface, an ATM interface, a WLAN interface, a cellular network communications interface, or a combination thereof. The Ethernet interface may be an optical interface, an electrical interface, or a combination thereof. In this embodiment of this application, the network interface 2004 may be used by the second system 2000 to communicate with another device.

During specific implementation, in an embodiment, the processor 2001 may include one or more CPUs. Each of the processors may be a single-core processor or a multi-core processor. The processor herein may be one or more devices, circuits, and/or processing cores for processing data (for example, computer program instructions).

During specific implementation, in an embodiment, the second system 2000 may include a plurality of processors. Each of the processors may be a single-core processor or a multi-core processor. The processor herein may be one or more devices, circuits, and/or processing cores for processing data (for example, computer program instructions).

During specific implementation, in an embodiment, the second system 2000 may further include an output device and an input device. The output device communicates with the processor 2001, and may display information in a plurality of manners. For example, the output device may be an LCD, an LED display device, a CRT display device, a projector, or the like. The input device communicates with the processor 2001, and may receive a user input in a plurality of manners. For example, the input device may be a mouse, a keyboard, a touchscreen device, or a sensor device.

In some embodiments, the memory 2003 is configured to store program modules and data. The program modules include a first management IP address type determining module 2031, a first information sending module 2032, a first correspondence receiving module 2033, a first management IP address checking module 2034, a first correspondence advertisement module 2035, a second management IP address type receiving module 2036, a second management IP address type determining module 2037, a second information sending module 2038, a second correspondence receiving module 2039, a second management IP address checking module 2040, a second correspondence advertisement module 2041, and a system role update information processing module 2042. In some embodiments, the modules shown in FIG. 17 are software modules, and the memory 2003 shown in FIG. 20 includes the software modules shown in FIG. 17.

In a specific embodiment, the second system 2000 in this embodiment of this application may correspond to the plurality of the foregoing embodiments. For example, the second system 2000 corresponds to the second system in the plurality of embodiments corresponding to FIG. 3 to FIG. 15. The processor 2001 in the second system 2000 reads instructions from the memory 2003, so that the second system 2000 shown in FIG. 20 performs all or a part of the operations performed by the second system in the plurality of the foregoing embodiments.

Figure 21:
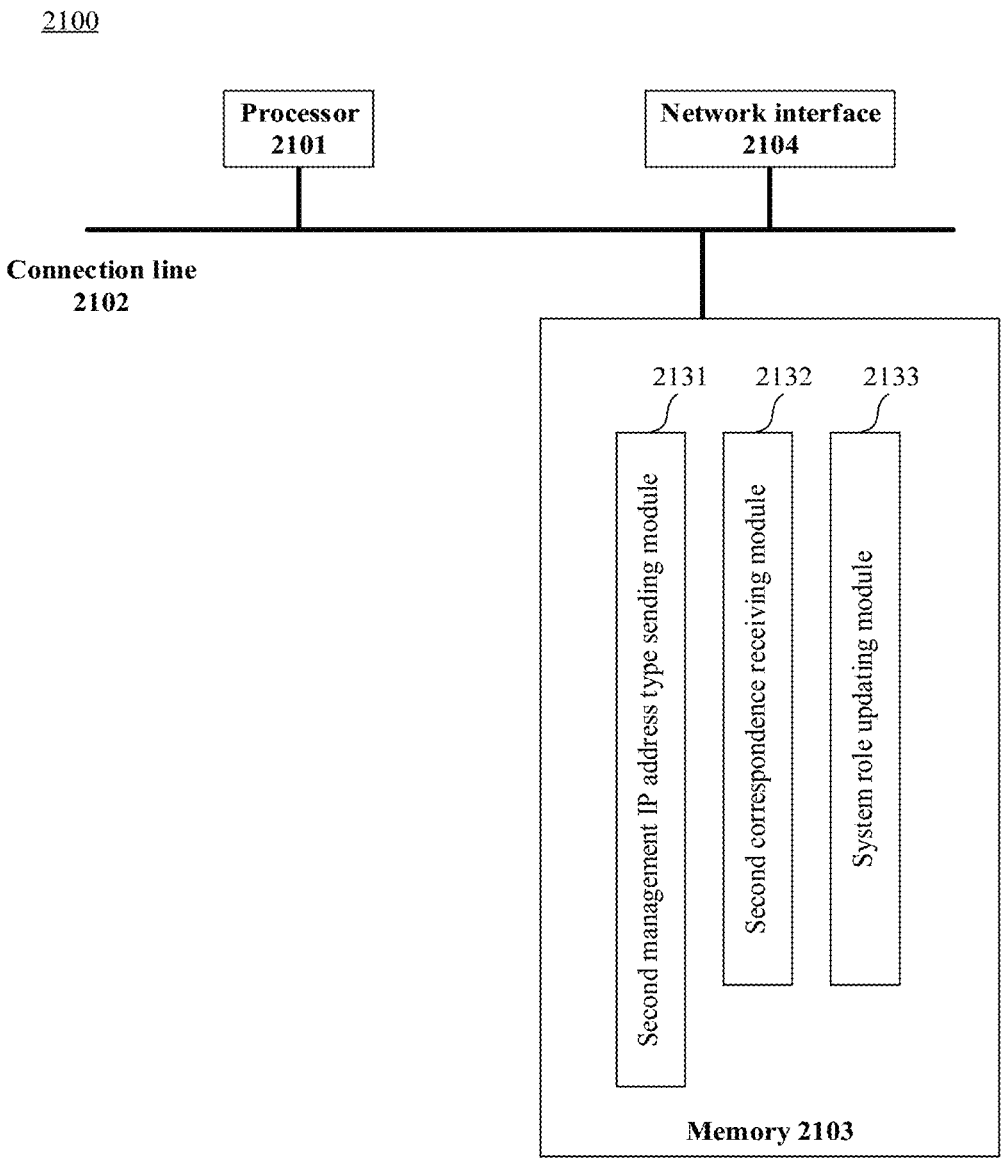
FIG. 21 is a schematic diagram of a network management system according to an embodiment of this application.

FIG. 21 is a schematic diagram depicting a structure of a network management system 2100 according to an embodiment of this application. The network management system 2100 shown in FIG. 21 is configured to perform operations related to the management IP address advertisement method shown in FIG. 3 and FIG. 10 to FIG. 15. As shown in FIG. 21, the network management system 2100 includes at least one processor 2101, a connection line 2102, a memory 2103, and at least one network interface 2104.

The processor 2101 is, for example, a general-purpose CPU, a DSP, an NP, a GPU, an NPU, a DPU, a microprocessor, or one or more integrated circuits configured to implement the solutions of this application. For example, the processor 2101 includes an ASIC, a PLD or another PLD, a transistor logic device, a hardware component, or any combination thereof. The PLD may be a CPLD, an FPGA, a GAL, or any combination thereof. The processor 2101 may implement or execute various logical blocks, modules, and circuits described with reference to content disclosed in the embodiments of the present disclosure. The processor may be a combination of processors implementing a computing function, for example, a combination including one or more microprocessors, or a combination of a DSP and a microprocessor.

The network management system 2100 may further include the connection line 2102. The connection line 2102 is configured to transfer information between the components of the network management system 2100. The connection line may be a PCI bus, an EISA bus, or the like. The bus may be classified as an address bus, a data bus, a control bus, and the like. For ease of representation, only one thick line is used to represent the bus in FIG. 21, but this does not mean that there is only one bus or only one type of bus.

The memory 2103 may be, for example, a ROM or another type of static storage device capable of storing static information and instructions, or a RAM or another type of dynamic storage device capable of storing information and instructions, or may be an EEPROM, a CD-ROM or another CD storage, another optical disc storage (including a compressed optical disc, a laser disc, an optical disc, a digital versatile optical disc, a Blu-ray optical disc, or the like), a magnetic disk storage medium or another magnetic storage device, or any other medium capable of carrying or storing expected program code in a form of instructions or data structures and capable of being accessed by a computer. The memory 2103 is not limited thereto. The memory 2103 may exist independently, and is connected to the processor 2101 through the connection line. The memory 2103 may be integrated with the processor 2101.

The network interface 2104 is configured to communicate with another device or a communications network by using any apparatus of a transceiver type, where the communications network may be the Ethernet, a radio access network, or a wireless local area network. The network interface 2104 may include a wired communications interface, and may further include a wireless communications interface. Further, the network interface 2104 may be an Ethernet interface, an FE interface, a GE interface, an ATM interface, a WLAN interface, a cellular network communications interface, or a combination thereof. The Ethernet interface may be an optical interface, an electrical interface, or a combination thereof. In this embodiment of this application, the network interface 2104 may be used by the network management system 2100 to communicate with another device.

During specific implementation, in an embodiment, the processor 2101 may include one or more CPUs. Each of the processors may be a single-core processor or a multi-core processor. The processor herein may be one or more devices, circuits, and/or processing cores for processing data (for example, computer program instructions).

During specific implementation, in an embodiment, the network management system 2100 may include a plurality of processors. Each of the processors may be a single-core processor or a multi-core processor. The processor herein may be one or more devices, circuits, and/or processing cores for processing data (for example, computer program instructions).

During specific implementation, in an embodiment, the network management system 2100 may further include an output device and an input device. The output device communicates with the processor 2101, and may display information in a plurality of manners. For example, the output device may be an LCD, an LED display device, a CRT display device, a projector, or the like. The input device communicates with the processor 2101, and may receive a user input in a plurality of manners. For example, the input device may be a mouse, a keyboard, a touchscreen device, or a sensor device.

In some embodiments, the memory 2103 is configured to store program modules and data. The program modules include a second management IP address type sending module 2131, a second correspondence receiving module 2132, and a system role updating module 2133. In some embodiments, the modules shown in FIG. 18 are software modules, and the memory 2103 shown in FIG. 21 includes the software modules shown in FIG. 18.

In a specific embodiment, the network management system 2100 in this embodiment of this application may correspond to the plurality of the foregoing embodiments. For example, the network management system 2100 corresponds to the network management system in the plurality of embodiments corresponding to FIG. 3 to FIG. 15. The processor 2101 in the network management system 2100 reads instructions from the memory 2103, so that the network management system 2100 shown in FIG. 21 performs all or a part of the operations performed by the network management system in the plurality of the foregoing embodiments.

Although the embodiments of this application disclose a plurality of operations and modules, these operations and modules are not all necessary for some technical problems. In some embodiments, although an equivalent or similar alternative operation or module of an operation or module is not disclosed, a person skilled in the art can determine an equivalent or similar alternative operation or module of the operation or module based on the disclosed operation or module without creative efforts.

The operation sequences in the specification, claims, and the accompanying drawings in this application are not limited to a specific sequence or a sequence in the description. It should be understood that data used in such a way can be performed at the same time or a sequence of the data can be changed in proper circumstances so that the embodiments described herein can be implemented in an order other than orders illustrated in accompanying drawings or described herein.

One or more technical solutions in the embodiments of this application have at least the following technical effects.

According to the foregoing method provided in the embodiments of this application, the first system determines the first management IP address based on the type that is of the first management IP address and that is determined by the second system, and sends the first correspondence between the system identification information of the first system and the first management IP address to the advertisement system and/or the second system. When the advertisement system operates properly, the advertisement system sends the first correspondence to the network management system, or when the advertisement system malfunctions, the second system updates, based on the received system role update information of the network management system, the system role to the second system and the advertisement system, and sends the first correspondence to the network management system. The network management system receives the first correspondence, and manages the first system based on information in the first correspondence. If the network management system supports to configure the second management IP address, the first system may determine and advertise the second correspondence by using the foregoing method. According to the method provided in the embodiments of this application, the first system may automatically generate a type of a network-adaptive management IP address and complete an online procedure. The network management system may switch a management IP address of a network based on obtained information about the second correspondence, and further advertise the management IP address when the advertisement system malfunctions. This method improves efficiency of advertising the management IP address, and improves reliability of the network management system.

The technical solutions provided in this application are described in detail above. The principles and implementations of this application are described herein by using specific examples. The descriptions about the embodiments are merely provided to help understand the method and core ideas of this application. In addition, a person of ordinary skill in the art can make variations and modifications to this application in terms of specific implementations and application scopes according to the ideas of this application. Therefore, content of the specification shall not be construed as any limitation on this application.

What is claimed is:

1. A method implemented by a first system, wherein the method comprises:
receiving, from a second system, first information indicating a first type of a first management Internet Protocol (IP) address of the first system;
determining the first management IP address based on the first type of the first management IP address; and
sending, to an advertisement system, a first correspondence that is between identification information of the first system and the first management IP address.

2. The method of claim 1, further comprising:
receiving, from the second system, second information indicating a second type of a second management IP address of the first system;
determining the second management IP address based on the second type of the second management IP address; and
sending, to the advertisement system, a second correspondence that is between the identification information and the second management IP address,
wherein the second management IP address is an alternative switching address of the first management IP address.

3. The method of claim 1, wherein the second system and the advertisement system are a same system.

4. The method of claim 1, further comprising:
sending, to the second system, a request packet for the first type of the first management IP address; and
receiving, from the second system in response to the request packet, a response packet comprising the first information.

5. The method of claim 1, further comprising receiving, from the second system, a Point-to-Point Protocol over Ethernet packet comprising the first information.

6. The method of claim 5, wherein the first information is either in a first extension field of a request packet in a PPPoE discovery phase or in a second extension field of a Network Control Protocol (NCP) request packet in a PPPoE session phase.

7. The method of claim 1, further comprising further determining the first management IP address from one or more generated management IP addresses based on the first type of the first management IP address.

8. The method of claim 1, further comprising generating the first management IP address based on the first type of the first management IP address.

9. The method of claim 1, further comprising further sending the first correspondence to the advertisement system based on a flood packet.

10. The method of claim 9, further comprising sending, the first correspondence to the advertisement system based on either opaque link state advertisement information of an Open Shortest Path First (OSPF) routing protocol or an extension field of an Intermediate System to Intermediate System (IS-IS) routing protocol.

11. The method of claim 1, comprising:
identifying that the second system and the advertisement system are different systems; and
sending, in response to identifying that the second system and the advertisement system are different systems, the first correspondence to the second system.

12. A first system, comprising:
a memory configured to store instructions; and
a processor coupled to the memory and configured to execute the instructions to cause the first system to
receive, from a second system, first information is indicating a first type of a first management Internet Protocol (IP) address of the first system;
determine the first management IP address based on the first type of the first management IP address; and
send, to an advertisement system, a first correspondence that is between identification information of the first system and the first management IP address.

13. The first system of claim 12, wherein when executed by the at least one processor, the instructions further cause the first system to:
- receive, from the second system, second information is indicating a second type of a second management IP address of the first system;
- determine the second management IP address based on the second type of the second management IP address; and
- send, to the advertisement system, a second correspondence that is between the identification information of the first system and the second management IP address, wherein the second management IP address is an alternative switching address of the first management IP address.

14. The first system of claim 12, wherein the second system and the advertisement system are different systems.

15. The first system of claim 12, wherein when executed by the at least one processor, the instructions further cause the first system to:
- send, to the second system, a request packet for a for the first type; and
- receive, from the second system in response to the request packet, a response packet comprising the first information.

16. The first system of claim 12, wherein when executed by the at least one processor, the instructions further cause the first system to further determine the first management IP address from one or more generated management IP addresses based on the first information.

17. A computer program product comprising computer-executable instructions that are stored on a non-transitory computer-readable storage medium and that, when executed by a processor, cause a first system to:
- receive, from a second system, first information indicating a first type of a first management Internet Protocol (IP) address of the first system;
- determine the first management IP address based on the first type of the first management IP address; and
- send, to an advertisement system, a first correspondence that is between identification information of the first system and the first management IP address.

18. The computer program product of claim 17, wherein the computer-executable instructions further cause the first system to:
- receive, from the second system, second information indicating a second type of a second management IP address of the first system;
- determine the second management IP address based on the second type of the second management IP address; and
- send, to the advertisement system, a second correspondence that is between the identification information of the first system and the second management IP address, wherein the second management IP address is an alternative switching address of the first management IP address.

19. The computer program product of claim 17, wherein the computer-executable instructions further cause the first system to:
- send, to the second system, a request packet for the first type; and
- receive, from the second system in response to the request packet, a response packet comprising the first information.

20. The computer program product of claim 17, wherein the computer-executable instructions further cause the first system to further determine the first management IP address from one or more generated management IP addresses based on the first information.

* * * * *

UNITED STATES PATENT AND TRADEMARK OFFICE
CERTIFICATE OF CORRECTION

PATENT NO. : 11,552,926 B2  
APPLICATION NO. : 17/535221  
DATED : January 10, 2023  
INVENTOR(S) : Jianwu Hao et al.

Page 1 of 1

It is certified that error appears in the above-identified patent and that said Letters Patent is hereby corrected as shown below:

In the Claims

Claim 5, Column 58, Line 28: "Ethernet packet comprising" should read "Ethernet (PPPoE) packet comprising"

Claim 10, Column 58, Line 44: "comprising sending," should read "comprising sending"

Claim 12, Column 58, Line 59: "system to" should read "system to:"

Claim 12, Column 58, Lines 60 and 61: "information is indicating" should read "information indicating"

Claim 13, Column 59, Lines 4 and 5: "information is indicating" should read "information indicating"

Signed and Sealed this  
Seventh Day of March, 2023

Katherine Kelly Vidal  
*Director of the United States Patent and Trademark Office*